United States Patent [19]

Hisatake et al.

[11] Patent Number: 5,434,690
[45] Date of Patent: Jul. 18, 1995

[54] LIQUID CRYSTAL DEVICE WITH PIXEL ELECTRODES IN AN OPPOSED STRIPED FORM

[75] Inventors: Yuzo Hisatake; Masumi Okamoto; Makiko Sato; Masahito Ishikawa; Hitoshi Hatoh, all of Yokohama, Japan

[73] Assignee: Kabushiki Kaisha Toshiba, Kanagawa, Japan

[21] Appl. No.: 280,556

[22] Filed: Jul. 26, 1994

[30] Foreign Application Priority Data

Jul. 27, 1993 [JP] Japan .................................. 5-184273
Sep. 24, 1993 [JP] Japan .................................. 5-237644

[51] Int. Cl.⁶ ............................................. G02F 1/1343
[52] U.S. Cl. ........................................ 359/87; 359/55
[58] Field of Search ................... 359/87, 55, 84, 77

[56] References Cited

U.S. PATENT DOCUMENTS 5,084,778 1/1992 DeJule et al. ............................ 359/87
5,233,449 8/1993 Shioji et al. ............................. 359/87

FOREIGN PATENT DOCUMENTS 2269042 1/1994 United Kingdom .................. 359/87

OTHER PUBLICATIONS

"Field-Controllable Liquid-Crystal Phase Grating", Hori et al., IEEE Transactions On Electron Devices, vol. ED-26, No.11, pp. 1734-1737, Nov. 1979.
"Liquid Crystal Display Devices Obtained with Scattering Properties of Microlens Effects", Nose et al., Japan Display '89, pp. 396-399, 1989.

Primary Examiner—Anita Pellman Gross
Assistant Examiner—James A. Dudek
Attorney, Agent, or Firm—Finnegan, Henderson, Farabow, Garrett & Dunner

[57] ABSTRACT

Between the substrates with electrodes arranged to face each other, there is held a neamtic liquid crystal layer having a molecular arrangement capable of obtaining two or more directions of the tilt direction when an electric field is applied. The electrode structure is formed by a region having the conductive sections the width of which is 50 μm or less in the widest part and the non-conductive sections the width of which is 50 μm or less in the widest part per pixel. Between the substrates arranged to face each other, the conductive sections and non-conductive sections are opposed to each other at least per pixel in a part of the region in the pixel, and given the width of the narrowest part of the non-conductive sections as S, and the distance between the electrodes of the substrates arranged to face each other as D, the relationship of D≧S/2 is satisfied. With this structure, it is possible to obtain a liquid crystal display device having a high light scattering characteristic at a low driving voltage, and also, with a high gradation having a bright contrast ratio. There is no inverted display even when a gradation display is executed, and a liquid crystal display device can be obtained with an extremely wide viewing angle. These characteristics can be sufficiently maintained in practice in a state of a voltage being applied.

15 Claims, 27 Drawing Sheets $\varphi = +\theta$

DIRECTION OF PLUS

DIRECTION OF MINUS

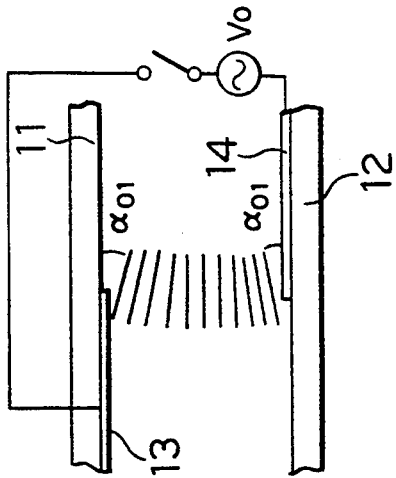
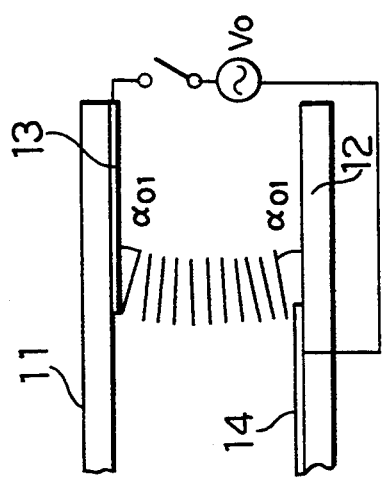
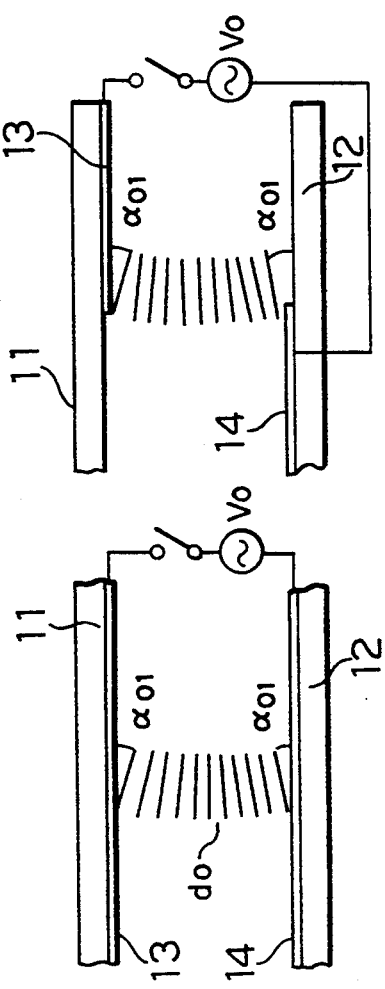
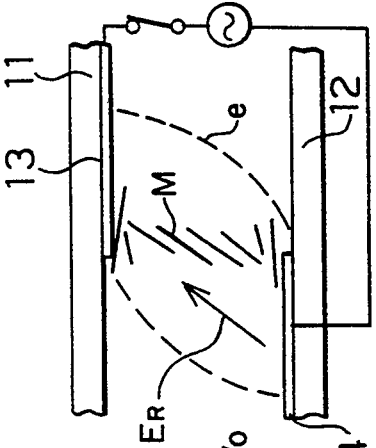
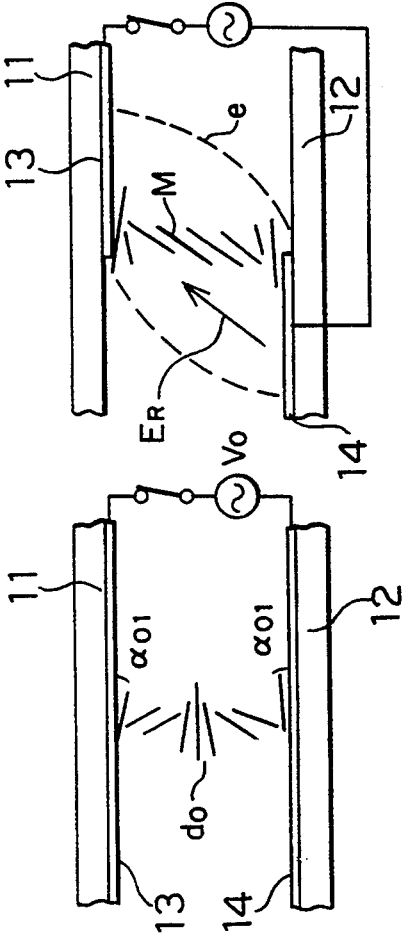

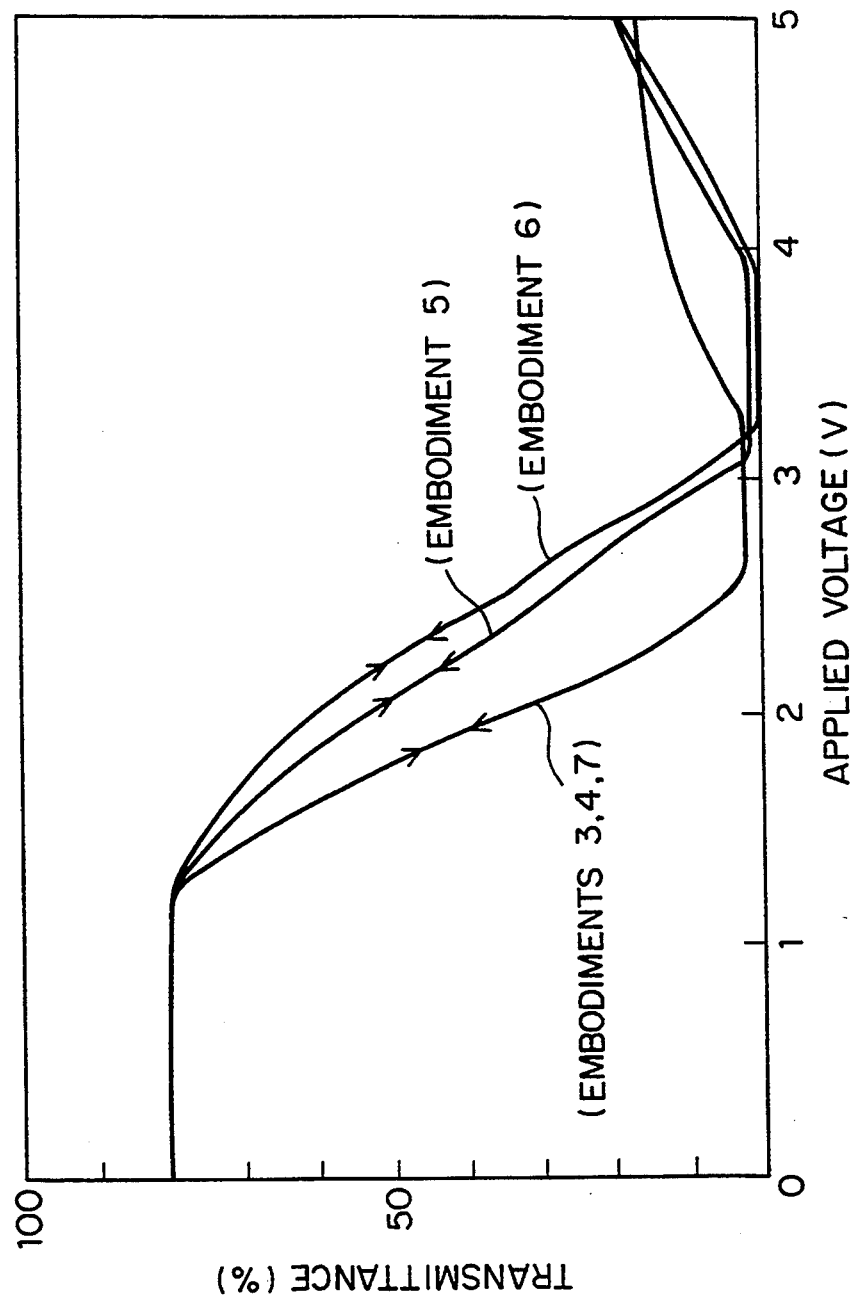

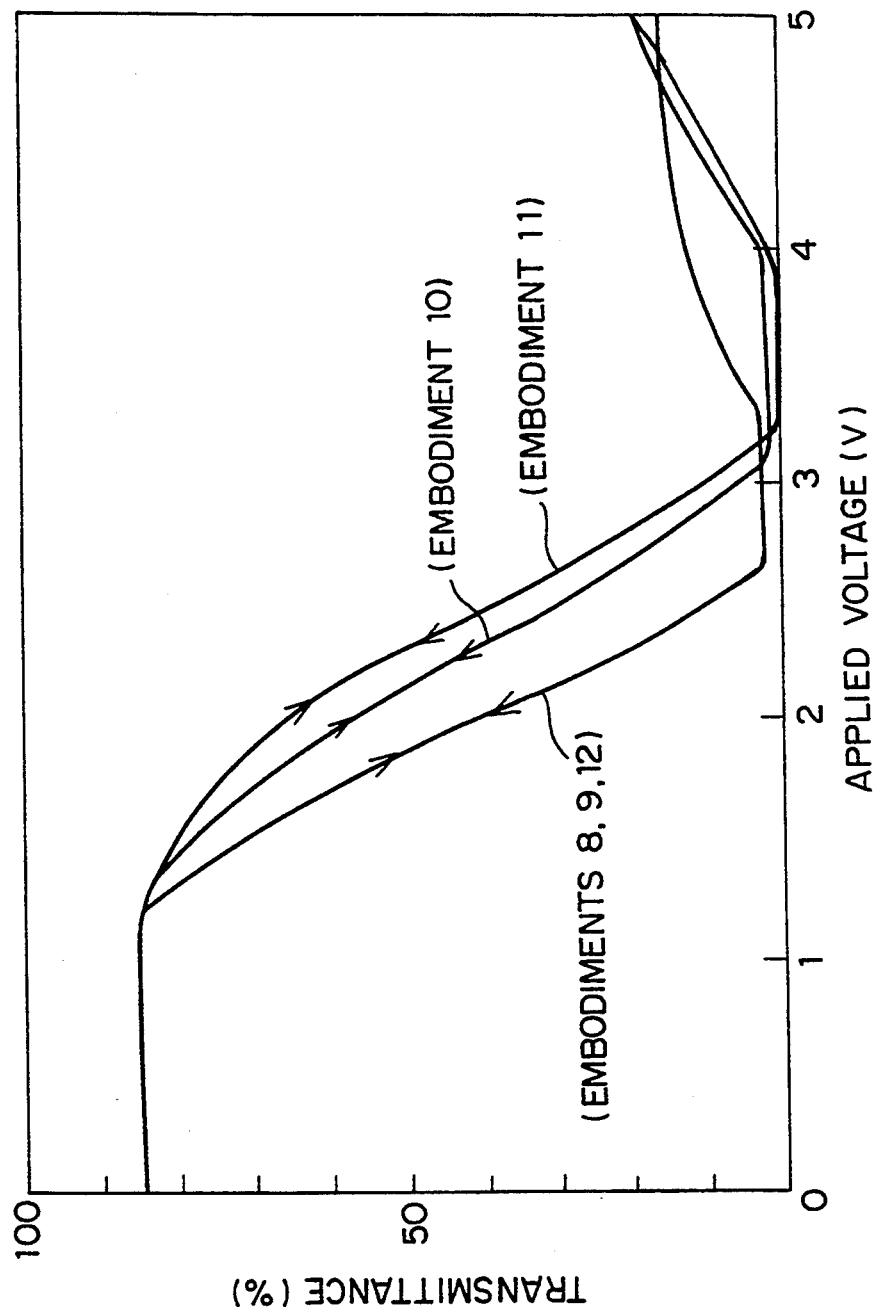

LIQUID CRYSTAL DEVICE WITH PIXEL ELECTRODES IN AN OPPOSED STRIPED FORM

BACKGROUND OF THE INVENTION

1. Field of the Invention

The present invention relates to a new liquid crystal display device, and a liquid crystal display apparatus using such device.

2. Description of the Related Art

In recent years, the liquid crystal display apparatus (hereinafter referred to as LCD) is widely used for a word processor, personal computer, projection TV, small TV, or the like.

In the LCD, an image is indicated by controlling the changes of transmittancy of light. For a control of the kind, there are, among others, a method for controlling light by a combination of the polarization effect of liquid crystal molecules and the polarizer; a method utilizing the phase change of liquid crystal by the application of light scattering and transmission; and a method utilizing the changes of lighting and shading of colors by adding pigments to the liquid crystal, and controlling the absorbing amount of visible light of the pigments.

The LCD using the method wherein the polarization effect and polarizer are combined is a twisted nematic LCD having the molecular arrangement which is twisted 90° for example In principle, it is possible to control the polarized light by use of a thin liquid crystal layer and application of a low voltage. As a result, the TN LCD presents the characteristics of a high contrast ratio with a quick response speed at a low power consumption. This TN LCD is applicable to a watch and a calculator by a simple matrix drive, and also, to a full-color liquid crystal TV by a combination of an active matrix drive provided with switching devices per pixel, and color filters.

However, since these LCDs in which the polarization effect and polarizer are combined should use a polarizer on principle, the amount of transmitted light of the LCD is considerably reduced. That is, the amount of transmitted light is reduced at least to 50% or less because at least one polarizer is used. Also, the represented colors and contrast ratio of these LCDs vary greatly depending on the viewing angles due to the orientation of the liquid crystal molecular arrangement. Therefore, these LCDs have the viewing angle dependence. In addition to this viewing angle dependence, the transmittance indicated by the amount of transmitted light is low against the amount of incident light. Actually, therefore, the TN LCD has not arrived at the stage as yet that its display capability exceeds that of the cold-cathode ray tube completely.

On the other hand, the LCD utilizing the phase change of the liquid crystal, and the LCD controlling the absorbing amount of visible light of pigments are, among others, the PC liquid crystal which uses an electric field to be applied to generating the phase change from the cholesteric phase having the molecular arrangement of a helical structure to the nematic phase having the molecular arrangement of a homeotropic structure, and the LCD using the White Tailor GH liquid crystal formed by adding pigments to liquid crystal molecules. These LCDs do not use any polarizer on principle. Therefore, the transmittance is not reduced. Also, being able to provide wide viewing angles, these LCDs are used for an automobile equipment, projection display and the like.

However, unless the thickness of the liquid crystal layer is made comparatively large or the helical strength of the liquid crystal molecules is enhanced, these LCDs cannot obtain sufficient light scattering. This is because of the fact that the light scattering is caused by various arrangements of liquid crystal molecules. That is, in order to cause light to scatter sufficiently, it is necessary to provide the helical axes in all the alignments with respect to the direction of the incident light in a case of the cholesteric phase having the helical structure, for example. For the provision of such helical axes in many numbers of alignments, the thickness of the liquid crystal layer must be made larger inevitably.

Therefore, there is a problem that not only a high driving voltage is required for these LCDs, but also the response speed becomes extremely slow. As a result, it is difficult to apply them to a display device requiring a large capacity of representation (many numbers of pixels).

Also, with these LCDs, it is difficult to conduct the gradation display because the transmittance changes abruptly as the applied voltage increases.

Further, when the mutual changes are controlled with respect to the conditions of the light scattering and transmission by application of an electric field, hysteresis occurs in the electro-optic characteristics because the molecular arrangement of liquid crystal differs conspicuously depending on whether it is in the state of light scattering or transmission. There are various theories dealing with the causes of this generation of hysteresis, and the causes are yet to be clarified. However, it is known that the hysteresis tends to occur when the liquid crystal molecules form the state of light scattering (that is, the state where the molecular arrangements of liquid crystal become an aggregate of fine domains) when electric field is not applied or the molecular arrangements are extremely different.

As above-mentioned, if hysteresis exists in the applied electric field-transmittance characteristics of LCDs, the multiplexed drive is difficult. Other problems are also encountered practically.

There have been proposed a LCD having means for obtaining light scattering (generally referred to as DS effect) by use of the Nn liquid crystal in which a conductive substance such as an organic electrotype is dissolved into the other LCD utilizing the phase change of crystal liquid, and by application of a high voltage at a low frequency, and a LCD having means for obtaining light scattering by application of thermo-optical effect. However, in these cases, too, the problems are encountered as above-mentioned.

Further, there have been proposed the polymeric scattering LCDs in which light scattering is enhanced as shown in FIG. 36A where many numbers of capsules are formed in polymer 3 held between substrates 1 and 2, and liquid crystal is sealed in them to form a capsule structure, and liquid crystal 6 is diffused among fabric polymers 5 to form a fabric polymer structure as shown in FIG. 36B. However, due to the method of its fabrication and principle, there are limits to the polymeric arrangement, and the mixing ratio of the polymer and liquid crystal layer for these polymeric scattering LCDs. Also, only a part of the applied voltage is charged to the liquid crystal because the voltage supplied from the outside source is divided and applied to the polymer and liquid crystal. As a result, the actuality is that if it is intended to satisfy a required driving characteristic for a high response speed at a sufficiently low power consumption, the light scattering capability cannot be obtained satisfactorily.

In these methods, too, the molecular arrangement of liquid crystal differs greatly depending on whether it is in the state of light scattering or transmission. Consequently, the hysteresis occurs in the electro-optic characteristics as above-mentioned. To countermeasure this, it may be possible to reduce the hysteresis to a certain extent by controlling the liquid crystal arrangement in the state of light scattering (by mixing a hydrophobic substance with polymer so that the liquid crystal arrangement on the inner surface of the capsule cell can be controlled, for example). However, this countermeasure brings about the weakened light scattering at the same time. Therefore, this is not practical. In the polymeric scattering LCD, too, problems are encountered as in the cases of the other LCDs utilizing the phase change of liquid crystal.

As a method for scattering light, it is conceivable that an alignment process is executed per fine region so that the liquid crystal molecules can be configured in various directions on the surfaces of the two substrates having electrodes, and that liquid crystal is held in the space formed by these surfaces inverted to oppose each other as inner surfaces. However, it is practically difficult to arrange the directions of alignment process to be different per fine region (rubbing direction, for example). This method cannot be any means for solving the aforesaid problem with respect to the generation of hysteresis, either.

SUMMARY OF THE INVENTION

The present invention is designed to solve the problems mentioned above. It is an object of the invention to obtain a liquid crystal display capable of widening the angle of viewing field and of enhancing transmittance by the novel LCD.

It is another object of the invention to an liquid crystal display capable of being driven at a low driving voltage while providing a quick response speed.

It is still another object of the invention to obtain a projection liquid crystal display apparatus by use of these LCDs.

According to the present invention, the above-mentioned objects are achieved by arranging a structure so that any media other than liquid crystal are not required for obtaining a good condition of light scattering, and further, the molecular arrangement of liquid crystal does not differ greatly whether it is in the state of light transmission or scattering. Also, by arranging such a structure as above, it is possible to fabricate the LCD without taking any complicated processing steps.

In other words, according to the present invention, it is possible to obtain a liquid crystal display having a high light scattering characteristics at a low driving voltage, and an excellent gradation at a high ratio of bright contrast. Also, there is no possibility that the display is inverted even when a gradation display is performed. An extremely wide angle of viewing field can be obtained for the LCD. These characteristics can be maintained sufficiently and practically while a voltage being applied.

The LCD of the present invention is suitably applicable to a display having a large capacity of representation by the TFT driving. Also, being able to obtain an excellent light scattering characteristics, this LCD is suitably applicable to a projection liquid crystal display apparatus.

A feature of the present invention is that the LCD is a liquid crystal layer held between the substrates having electrodes arranged to face each other, and at least one of the substrates having the electrodes arranged to face each other has an area comprising conductive sections the electrode structure of which is made to define the width of its widest part to be 50 $\mu$m or less per pixel, and non-conductive sections the width of which is 50 $\mu$m or less in its widest part per pixel; and that the conductive sections and non-conductive sections are opposed to each other per pixel at least in a part of area in the pixel between both substrates arranged to face each other, and further, given the width of the narrowest part of the non-conductive sections as S, while the interval between the electrodes on both substrates arranged to face each other is defined as D, the relationship of $$D \geq S/2$$

is satisfied.

Also, the LCD of the present invention is characterized in that the liquid crystal layer is formed by a nematic component having the molecular arrangement the tilt direction of which is obtainable in two or more directions when the electric field is applied.

Further, the LCD of the present invention is characterized in that between the substrates arranged to face each, the tilted electric field is formed at least in two or more directions in one pixel with respect to the diction of the vertical normal line between the substrates, and that the liquid crystal molecules forming the liquid crystal layer provide a spray arrangement in a state where no voltage is applied, and the liquid crystal layer can provide the degree of freedom of tilt up or tilt down direction in two or more directions in a state where a voltage is applied.

Also, in the above-mentioned LCD, the width of at least one of the substrates with electrodes arranged to face each other is 30 $\mu$m or less in its widest part, and the nematic liquid crystal component has means for inducing the tilt orientation to allow the longer axes of liquid crystal molecules to be aligned in one direction on the surfaces of the substrates, and that given the intersecting angle of the directions of liquid crystal arrangements on the two substrates as $\theta$ ($0° \geq \theta 90°$); and also, given the cell twist angle which is determined to align the liquid crystal in the uniform twist in accordance with the pretilt angle on the surfaces of the two substrates as $\psi$, the twist angle of the liquid crystal $\omega$ is $\pm\theta + 180°$ or $\pm\theta - 180°$ if the $\psi$ is $\pm\theta$ (where the counterclockwise twist is defined as +, and the clockwise twist, as −); and the twist angle of the liquid crystal $\omega$ is $\pm\theta + 180°$ or $\pm\theta - 180°$, and when $\psi$ is $\pm(\theta - 180°)$, the twisted angle $\omega$ is $\pm\theta$, with the proviso that $\omega$ and $\theta$ have the same mark.

Further, the above-mentioned LCD is characterized as given below. When both of the substrates arranged to face each other are observed at the cross-section in the direction of the normal line of the electrodes on both substrates, the width RE having the conductive sections only on the lower substrate, the width FE having the conductive sections only on the upper substrate, and the width SS having the non-conductive sections on both substrates are arranged in the order of:

RE·SS·FE·SS·RE·SS·FE·SS·. . .

in the sectional shape, the RE and FE are arranged alternately with the SS between them. Also, at least per pixel, the RE are electrically connected to each other in a location in the pixel to form the electrode structure, and the FE are electrically connected to each other in a location in the pixel to form the electrode structure. The nematic liquid crystal component has means for inducing the tilt orientation to allow the longer axes of the liquid crystal molecules to be aligned in one direction on the surfaces of the substrates, and the LCD is characterized in that the intersecting angle of the directions of liquid crystal arrangements on the two substrates is $\theta$ ($0° \leq \theta \leq 90°$); the cell twist angle which is determined to align the liquid crystal in the uniform twist is $\psi$, and that if the $\psi$ is $\pm \theta$ (where the counterclockwise twist is defined as $+$, and the clockwise twist, as $-$) in condition that no electric field is applied to the aforesaid liquid crystal layer, the twist angle of the liquid crystal $\omega$ is $\pm \theta + 180°$ or $\pm \theta - 180°$; and if the $\psi$ is $\pm(\theta - 180°)$, the twist angle of the liquid crystal $\omega$ is $\pm \theta$, with the proviso that $\omega$ and $\theta$ have the same mark.

When both of the substrates arranged to face each other are observed at the cross-section in the direction of the normal line of the electrodes on said substrates, the width RE having the conductive sections only on the lower substrate, the width FE having the conductive sections only on the upper substrate, and the width EE having the conductive sections on said substrates are arranged in the order of:

RE·EE·FE·EE·RE·EE·FE·EE·. . . or
RE·FE·RE·FE·RE·FE·. . .

in the sectional shape, the RE and FE are arranged alternately with the EE between them or RE and FE are arranged alternately, and also, at least per pixel, the RE are electrically connected to each other in a location in the pixel to form the electrode structure, and the FE are electrically connected to each other in a location in the pixel to form the electrode structure, the nematic liquid crystal component has means for inducing the tilt alignment capable of arranging the longer axes of the liquid crystal molecules in one direction on the surfaces of the substrates, and given the intersecting angle of the directions of liquid crystal molecular arrangement on the two substrates as $\theta$ ($0° \leq \theta \leq 90°$), and the cell twist angle determining the uniformed twist arrangement of liquid crystal by the pretilt angles on the surfaces of two substrates as $\psi$, and then, the $\psi$ is $\pm \theta$ (where the counterclockwise twist defined as $+$, and the clockwise twist, as $-$), in a state that no electric field is applied to the liquid crystal layer, the twisted angle $\omega$ is $\pm \theta + 180°$ or $\pm \theta - 180°$, and when said $\psi$ is $\pm(\theta - 180°)$, the twisted angle $\omega$ is $\pm \theta$, with the proviso that $\theta$, $\omega$ and $\psi$ have the same mark.

In the above-mentioned LCD, the liquid crystal component is formed by the liquid crystal having a positive or negative dielectric anisotropy, and the tilt direction obtainable in two or more directions by the application of the electric field is the tilt-up direction when the liquid crystal has the positive dielectric anisotropy. If the liquid crystal has the negative dielectric anisotropy, it is the tilt-down direction. The tilt direction obtainable in two or more directions by the application of the electric field can be obtained 1) by the liquid crystal molecular arrangement which is aligned to make the difference in the pretilt angles of the liquid crystal 0.5° or less; 2) by the liquid crystal molecular arrangement which is aligned so that it is vertically orientated while both the pretilt angles $\alpha_0$ being set equally at 90°; 3) by the liquid crystal molecular arrangement which is aligned to make both pretilt angles $\alpha_0$ to be more than 45° and less than 90° while the difference in the pretilt angles of the upper and lower substrates is 0.5° or less, and to set the directions in which to obtain the aforesaid pretilt angles $\alpha_0$ in a bending alignment having the same directions on the upper and lower sides.

The above-mentioned LCD is characterized in that its electrode structure per pixel is shaped in stripe on both substrates where at least a part of each pixel is formed by the conductive sections and non-conductive sections. Also, it is characterized in that at least one of the substrates with electrodes is provided with switching devices. It is possible to mix fine grains of a diameter smaller than the interval D between electrodes in the space between the substrates of the above-mentioned structure or to arrange protuberance shorter than the interval D between the electrode at least on one of the substrates. Further, a transparent protective layer is formed on the electrodes, and the LCD is characterized in that the refractive index of this transparent protective layer is 0.9 to 1.1 times that of the electrode material.

The liquid crystal display apparatus of the present invention is a projection type liquid crystal display apparatus utilizing the above-mentioned LCD. It is characterized in using an optical system such as Schilien optical system wherein a parallel light is incident upon the LCD, and among the directions in the controlled light by this LCD advances, the light in a part of such directions is projected. For a projection type liquid crystal display apparatus of the kind, it is possible to form the apparatus by use of two or more LCDs to allow a divided parallel light to include at least one color of red, blue, and green which is incident upon each of the LCDs or to provide color filters of two or more colors for the LCDs to form the apparatus.

BRIEF DESCRIPTION OF THE DRAWINGS

FIGS. 12A to 12F are views showing cross-sections to illustrate the behaviors of the spray arrangement of liquid crystal molecules in accordance with the presence or absence of an applied voltage.

FIG. 27 is a view showing the relationship of the transmittance and applied voltage curbs according to the embodiments 3 to 7.

FIG. 29 is a view showing the relationship of transmittance and applied voltage curbs according to the embodiments 8 to 12.

DESCRIPTION OF THE PREFERRED EMBODIMENTS

The LCD of the present invention is to control light by a new structure of liquid crystal cells. Hereinafter, the description will be made of the principle of light control according to the present invention.

The LCD of the present invention is such that a state of light transmission is implemented by effectively arranging molecules uniformly in each pixel, and that a state of light scattering is implemented by obtaining the effect of a dioptric lens or the effect of diffraction grating in two or more kinds of electric field directions. Here, the effect of a dioptric lens means an effect to refract an incident light by a continuous change of the refractive index of a liquid crystal layer while liquid crystal molecules continuously tilt in the thickness direction of the liquid crystal layer. Also, the effect of a diffraction grating means that the refractive index $n_e$ of the extraordinary rays on liquid crystal molecules and the refractive index $n_o$ of ordinary rays on liquid crystal molecules alternately appear on the liquid crystal surface regularly to form the diffraction grating on the liquid crystal layer, and consequently, the parallel rays of light are scattered.

It is possible to obtain such light scattering generated by the effect of the dioptric lens or of the diffraction grating if the molecular arrangements are made in the form of walls at the boundaries of two or more kinds of electric field directions.

Figure 1A:
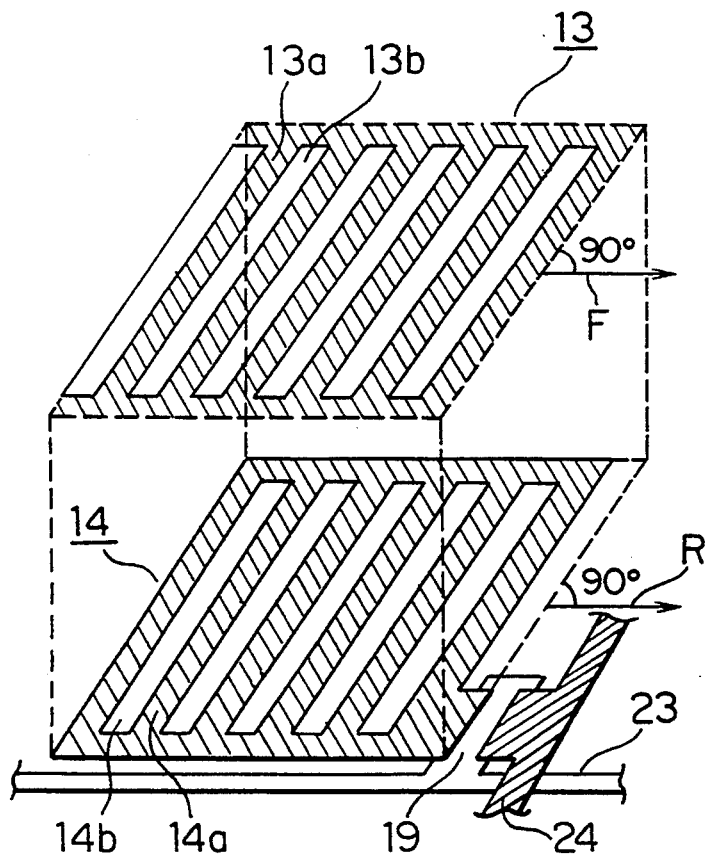
FIG. 1A is a perspective view showing the electrodes of LCD according to the present invention.
Figure 1B:
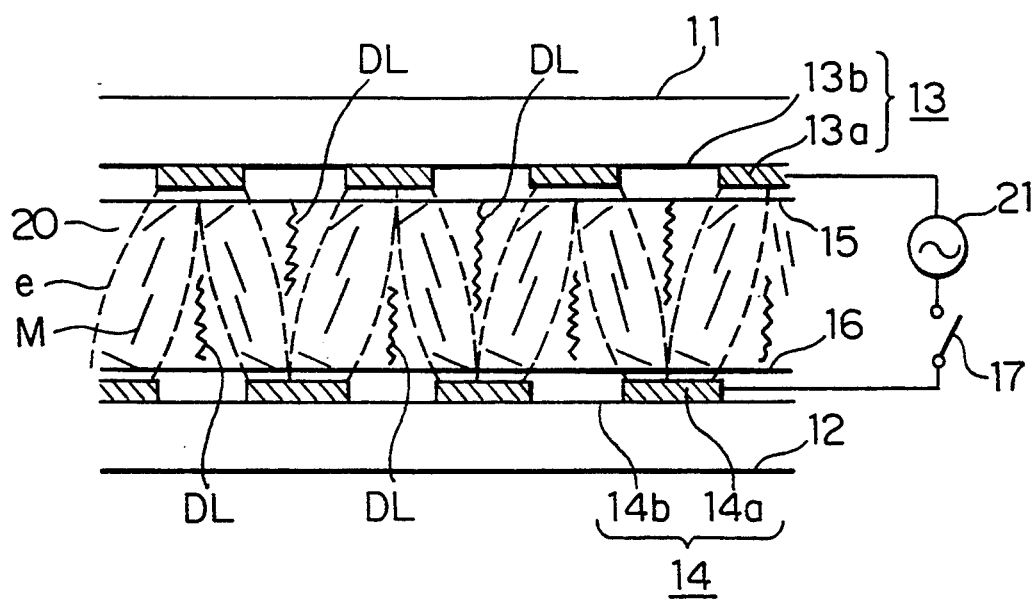
FIG. 1B is a view showing the cross-section of the liquid crystal cell of LCD according to the present invention.

FIG. 1B shows an example of the structure of molecular arrangement per pixel of the LCD according to the present invention. The structure of molecular arrangement shown in FIG. 1B is the one formed by a spray arrangement and a twist added to it, and further, the structure is characterized in that the upper and lower pretilt angles of liquid crystal molecules are substantially equal on the upper and lower surfaces of the substrates. Also, the structure of molecular arrangement shown is the one when a voltage is applied. That is, electrodes 13 and 14 are arranged to form a plurality of stripes on the upper and lower substrates 11 and 12 for each of the pixel units. The conductive section 13a and 14a and non-conductive section 13b and 14b of each electrode are set at the same intervals and opposed to each other with a shift of ½ pitch, respectively. The orientations of the upper and lower alignment films 15 and 16 are in the same direction, and the liquid crystal molecules M of the liquid crystal layer 20 are in the spray arrangement. When a voltage is applied to the upper and lower electrodes 13 and 14, an electric field e is generated in the traverse direction. In a molecular arrangement such as this, the tilt directions of the molecules can be two as shown in FIG. 1B depending on the way in which the electric field is applied. This is because of the fact that the liquid crystal molecular arrangements are symmetrical in the upper half and lower half of the liquid crystal layer when no voltage is applied. That is, the tilt direction of liquid crystal molecules has a degree of freedom of two or more. Therefore, when a voltage is applied, wall lines can be generated in the boundaries (DL in FIG. 1B) in the tilt direction of molecules (in order to distinguish them from the generally-meant disclination which is generated with a strong memory capability when an electric field is applied, these lines are referred to as "walls" in the present invention). Therefore, it is possible to obtain a function whereby to scatter an incident light. In order to provide the degree of freedom of two or more for the tilt direction of liquid crystal molecules, it may be possible to use, besides the structure of molecular arrangement shown in FIG. 1B, a nematic liquid crystal component having the negative dielectric anisotropy as a liquid crystal component, for example, so that the liquid crystal molecules can be arranged to be perfectly vertical in which the pretilt angles are 90° in the upper and lower substrates. In this case, too, the same effect is obtainable. The degree of freedom is also two or more for the tilt down direction of liquid crystal molecules.

In any case, it is possible to solve the above-mentioned problems and obtain an excellent capability of representation if consideration is given to the electrodes so that the liquid crystal molecules can be effectively arranged uniformly when no voltage is applied, and that the tilted electric field per fine region can be applied to the two or more opposing directions with respect to the liquid crystal arrangement the degree of freedom of which is two or more for the tilt up or tilt down direction of liquid crystal molecules.

Here, in order to implement the tilted electric field, it is a prerequisite that a relationship of $D \geq S/2$ is satisfied, where the S is the width of the narrowest part of the non-conductive section, and the D is the interval between electrodes on both substrates arranged to face each other.

Figure 2:
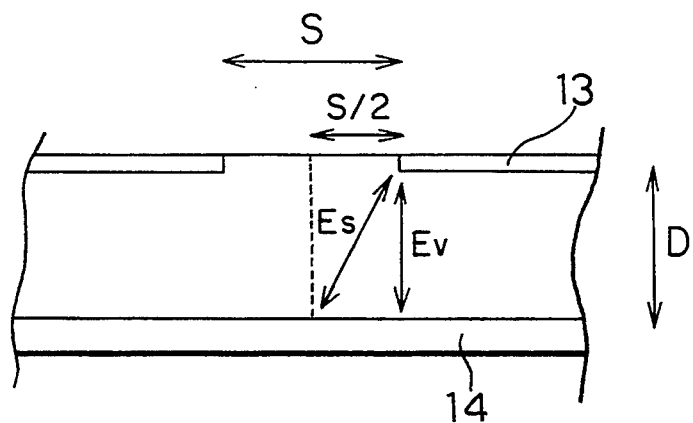
FIG. 2 is a view showing an electrode structure according to the present invention.

Hereinafter, in conjunction with FIG. 2, the description will be made of the reason why this relationship must be satisfied. FIG. 2 is a view showing a cross-section of the structure of electrodes used for the present invention. In FIG. 2, the weakest electric field is Es, and the strength of this electric field determines the strength of the tilted electric field. Also, the arrangement of liquid crystal molecules, which influences the effect of the dioptric lens or of the diffraction grating, is controlled by the magnitude of the strength of this tilted electric field.

As the result of experiments, it is found that when the strength of electric field Es is less than $\sqrt{2}/2$ of Ev, light can be controlled effectively. Therefore, $Es \geq \sqrt{2}/2$ Ev is a prerequisite. To implement this condition, $D \geq S/2$. If the D and S are set within this range, it is possible to adequately control the liquid crystal molecules in the region S by the electric field as required, and also, to control the tilt direction and alignment of the arrangement.

The present invention is to enhance the light scattering effect utilizing the condition that the directions of liquid crystal molecules change by the presence or absence of an applied voltage having the component of traverse electric field, in other words tilted electric field, if the liquid crystal is not arranged in the uniform twist. Therefore, the conductive section and non-conductive section are formed in the fine region of the electrodes, and the conductive section on one of the opposing electrodes is arranged to face the non-conductive section on the other electrode across the substrates with the liquid crystal layer between them.

As a premise for describing the function of the present invention, the pretilt angles, uniform twist arrangement, and non-uniform twist arrangement will be described.

The molecule of nematic liquid crystal is shaped in the form of a thinly elongated bar. When the liquid crystal molecule is in contact with the alignment film rubbed on the substrate, the longer axis of the molecule in the form of bar is orientated in one specific direction depending on the nature of the surface of the alignment film. For example, if an alignment film is a polyimide alignment film or the like, the longer axes of liquid crystal molecules are orientated along the direction of rubbing. Also, if it is a polystyrene alignment film or the like, the longer axes of the liquid crystal molecules are aligned in the direction rectangular to the rubbing direction in the plane direction of the film. Also, as another method of alignment process, there is a method for depositing an alignment film on a substrate. If silicon oxide is diagonally deposited on the surface of a substrate at an incident angle of 85° to the surface, the longer axes of liquid crystal molecules are oriented in the direction toward the source of deposition.

Figure 3A:
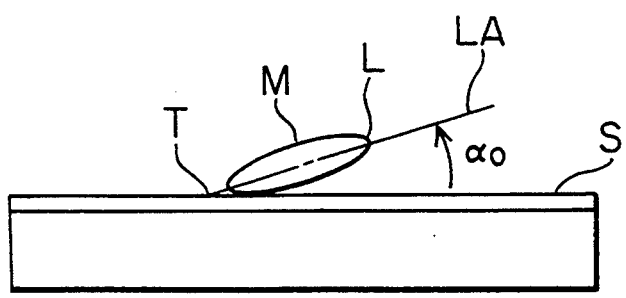
FIG. 3A is a view showing a cross-section to illustrate a pretilt angle.

In practice, however, the liquid crystal molecules M are not aligned in parallel to the surface S of the alignment film in these alignment processes. The molecules are raised at a given angle $\alpha_0$ by the tilt alignment as shown in FIG. 3A with respect to the surface of the alignment film, that is, the surface S of the substrate when the molecules are aligned. This angle $\alpha_0$ is approximately 1° to 15° in the polyimide alignment film. On the surface of this substrate, the angle $\alpha_0$ formed by the longer axis of liquid crystal molecule being in contact with the surface thereof is called a pretilt angle.

Figure 3B:
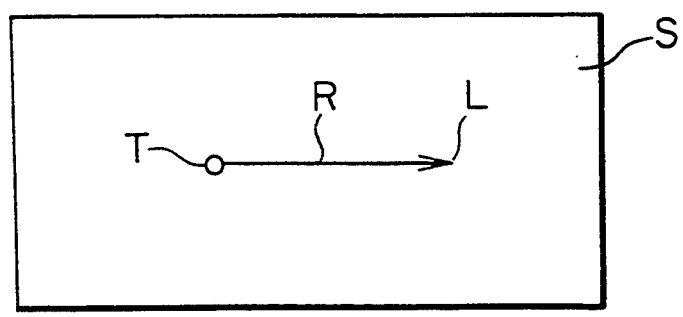
FIG. 3B is a plan view showing the pretilt angle.

In this case, provided that the end portion of the longer axis LA of liquid crystal molecule raised from the substrate is defined as leading portion L, and its end portion approaching the substrate side, as trailing portion T as shown in FIG. 3A, it is assumed for the sake of explanation that the aligned liquid crystal molecules are represented by an arrow R in the direction from T to L on the plane of the alignment film as shown in FIG. 3B, for example.

Figure 4A:
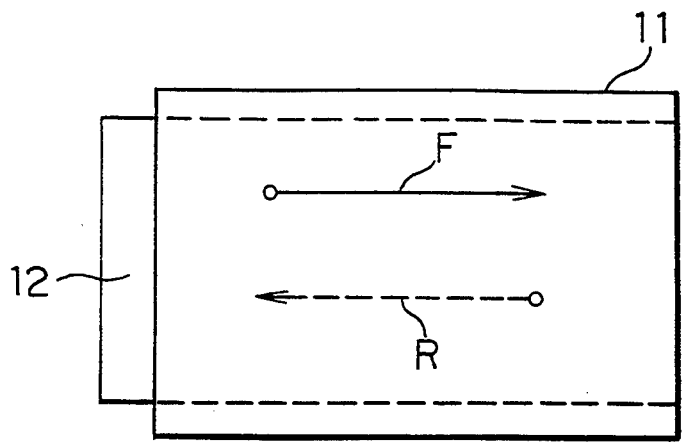
FIG. 4A is a plan view showing a uniform arrangement.

The example shown in FIG. 4A represents a case where the alignment process is executed to direct the molecular arrangement on the front substrate, that is, the upper substrate 11, as F (indicated by an arrow in solid line), while the molecular arrangement on the rear substrate, that is, the lower substrate 12, as R (indicated by an arrow in broken line). Each arrangement is aligned in the opposite direction, that is, directions different from each other at 180° on each plane of the substrates.

Figure 4B:
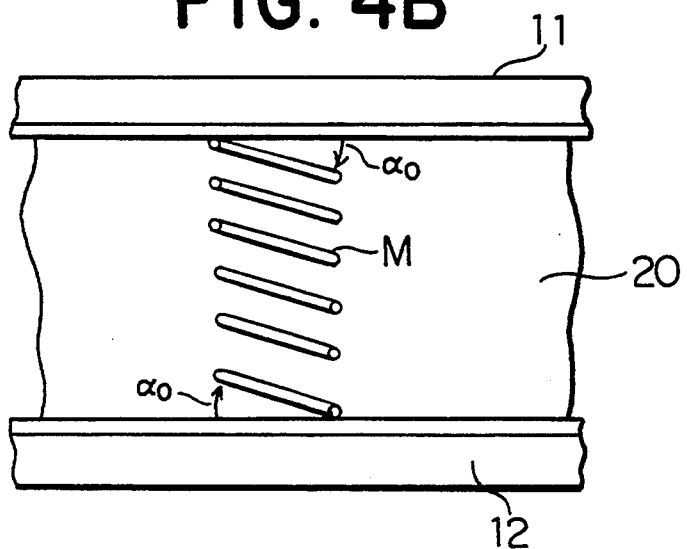
FIG. 4B is a view showing a cross-section to illustrate the uniform arrangement.

With this structure, the liquid crystal molecules M can be arranged from the upper substrate 11 to the lower substrate 12 at a specific and uniform angle over the entire length of the thickness of liquid crystal layer 20 as shown in FIG. 4B if the nematic liquid crystal (no chairal agent is mixed in it, for example) is filled with the positive dielectric anisotropy so that the liquid crystal is not twisted. In general, a molecular arrangement of the kind is called a uniform arrangement. This is the fundamental structure for the conventional LCD.

Figure 5:
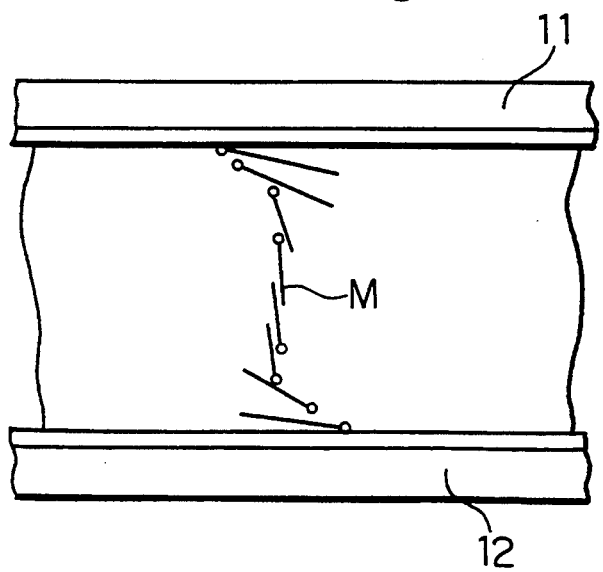
FIG. 5 is a view showing a cross-section to illustrate the behavior of a uniformly twisted arrangement of liquid crystal molecules when a voltage is applied.

In an LCD of this structure, the liquid crystal molecules M are arranged in the direction substantially rectangular to the substrates in accordance with the tilt directions of liquid crystal molecules in the vicinity of the surfaces of both substrates as shown in FIG. 5 if a voltage higher than the threshold voltage, that is, a driving voltage, is applied to the liquid crystal layer.

Figure 6:
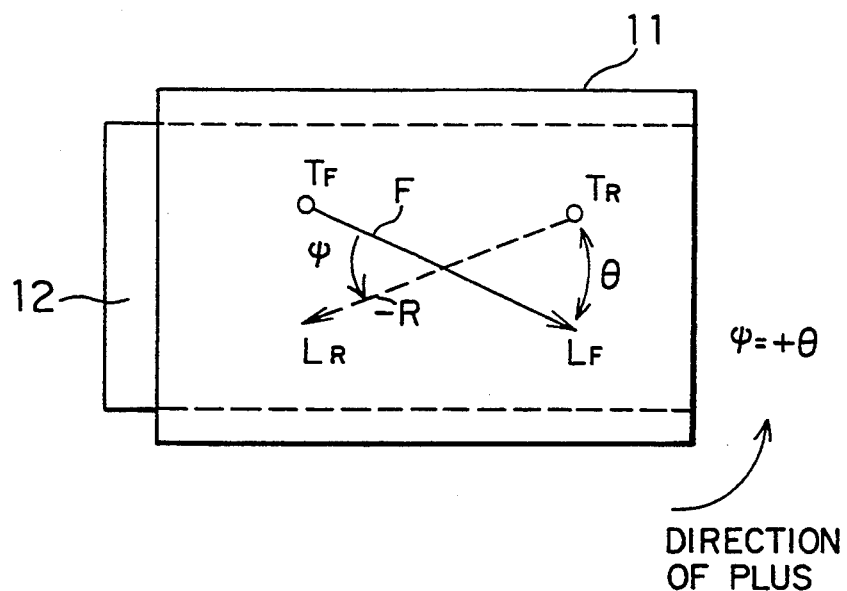
FIG. 6 is a plan view showing a uniformly twisted arrangement.

FIG. 6 is a view showing a state where the lower substrate 12 is assumed to be twisted from the state shown in FIG. 4A at an angle of $\theta$ ($\leq 90°$) to the upper substrate 11 serving as the reference. Here, in order to allow the molecular arrangement to maintain the uniform arrangement, it is necessary for the liquid crystal to be arranged with a twist (in the rotational direction indicated by an arrow in FIG. 6) counterclockwise at an angle $\psi$ between the substrates. To implement this arrangement, the liquid crystal material should only be selected so that it can be twisted at an angle $\psi$. The molecular arrangement thus obtained is called a twisted uniform arrangement. In this case, the angle $\psi$ is called a twisted angle of uniform arrangement. In this respect, an ST-LCD, a prior art, sets this angle $\psi$ at 90° to 270° and provides a twisted uniform arrangement.

Figure 7:
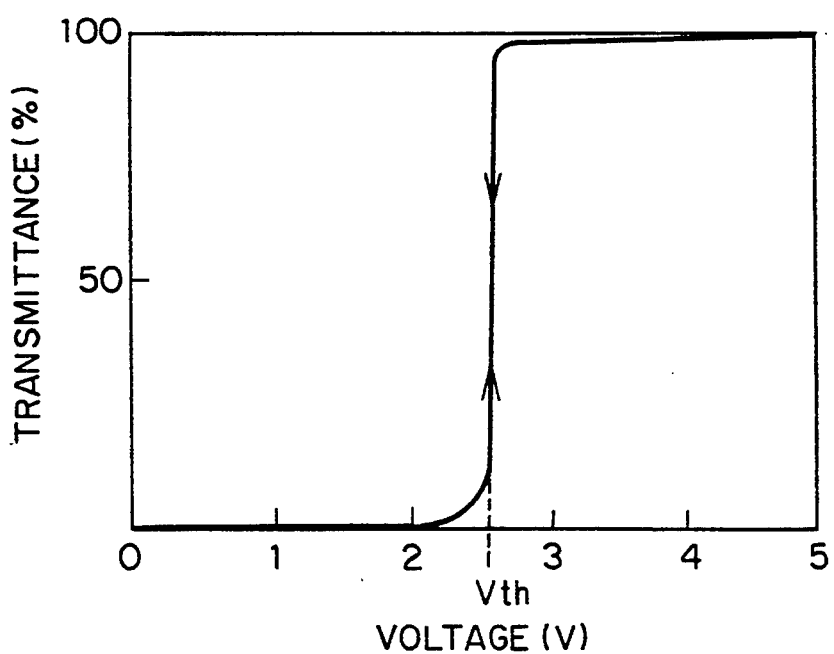
FIG. 7 is a diagram showing a curved line to illustrate the relationship between an applied voltage and transmittance.

FIG. 7 is a view showing the relationship between the transmittance of LCD and applied voltage in the ST-LCD the $\psi$ of which is 180°. From FIG. 7, it is understandable that the ST-LCD changes its transmittance abruptly beyond a certain voltage, that is, a voltage higher than a threshold voltage $V_{th}$. From this, it is conceivable that when the ST-LCD is at voltages lower than the threshold voltage, it should be in a molecular arrangement close to that in a state where no voltage is applied. In order to define the molecular arrangement of the LCD having the twist angle of more than 90° and less than 270° as in the case of the crystal of the ST-LCD, the definition should be made in condition that the applied voltage is at a value lower than the threshold voltage (similar to no voltage being applied). Also, in a transmittance-applied voltage characteristics of the kind (the curve shown in FIG. 7), this abruptness appearing in it is generally represented by a value $\gamma$ which is arrived at by dividing the difference in the respective values of applied voltages providing transmittance of 90% and 10% by the value of applied voltage the transmittance of which is 90%.

In the LCD of this structure, if a voltage higher than the threshold voltage is applied (similar to a voltage being applied) to the liquid crystal layer as in the case of the uniform arrangement without any twist as described earlier, the liquid crystal molecules M are arranged in the direction substantially rectangular to the substrates in accordance with the tilt direction of the liquid crystal molecules in the vicinity of the surfaces of the substrates as if the arrangement shown in FIG. 5 were twisted.

As clear from FIG. 6, the twist angle $\psi$ of the uniform arrangement represents an angle to the leading portion $L_R$ of the liquid crystal molecule having the alignment R on the lower substrate with respect to the trailing portion $T_F$ of the liquid crystal molecule having the alignment F on the upper substrate which serves as reference.

Figure 8:
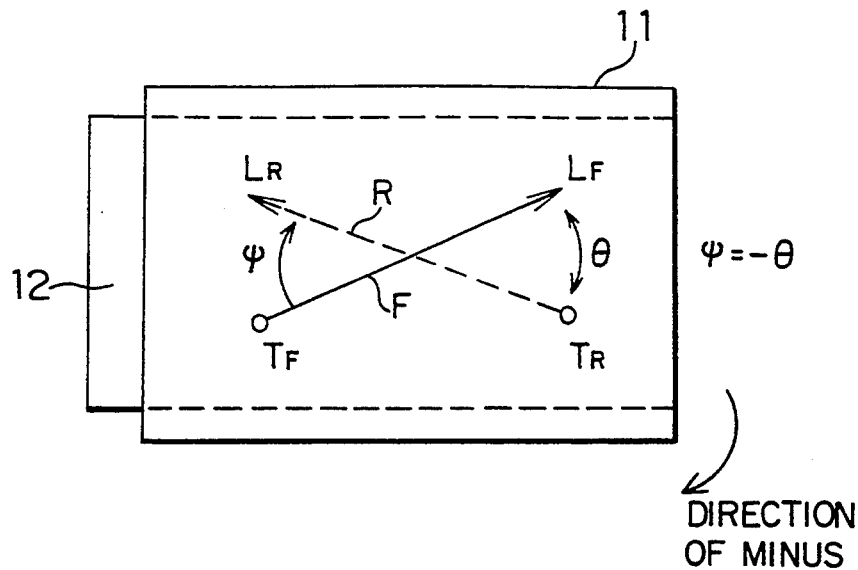
FIG. 8 is a plan view showing a uniformly twisted arrangement.

The $\psi$ can be defined in two ways: $+\theta$ is for the twist which rotates counterclockwise as shown in FIG. 6, and $-\theta$, clockwise as shown in FIG. 8.

Figure 9A:
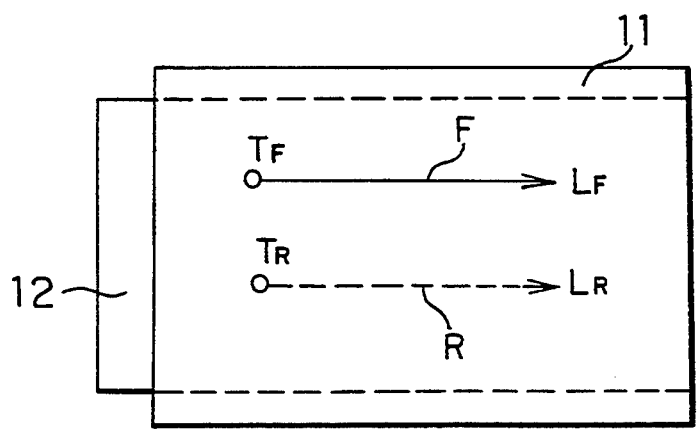
FIG. 9A is a plan view showing a spray arrangement.
Figure 9B:
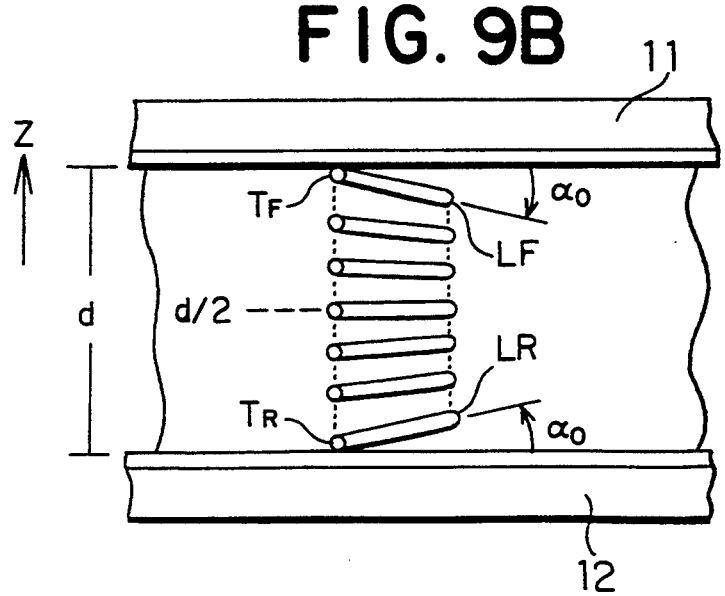
FIG. 9B is a view showing a cross-section to illustrate a spray arrangement.

Meanwhile, it is also possible to arrange liquid crystal molecules as shown in FIG. 9B. An arrangement of the kind can be attained if a nematic liquid crystal component which does not create any twisting is maintained under the structure shown in FIG. 9A as in the case of the arrangement as described earlier in conjunction with FIG. 4B.

In a molecular arrangement of the kind, the molecular arrangements F and R on the upper and lower substrates are in the same direction. The tilt angles of the liquid crystal molecules in the molecular arrangement are gradually reduced from the pretilt angle $\alpha_0$ of the upper substrate 11 as shown in FIG. 9B, and after being in parallel to the substrate 11 at the mid point d/2 of the thickness d of the liquid crystal layer, the molecules are tilted gradually to the inverted angles until arriving at the pretilt angle $\alpha_0$ of the lower substrate 12. That is, in making the molecular arrangement, the leading portions $L_F$ and $L_R$ approach each other, while the trailing portions $T_F$ and $T_R$ are apart from each other. A nonuniform arrangement of the kind is called a spray arrangement.

Figure 10:
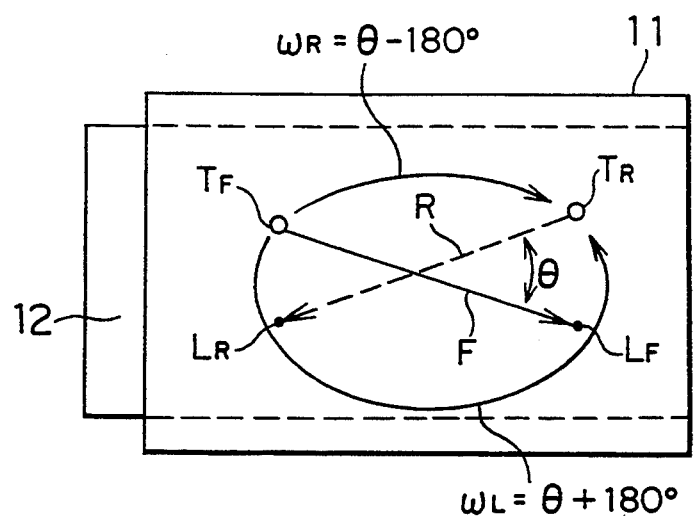
FIG. 10 is a plan view showing a spray twist arrangement.

Now, a consideration is given to obtaining a structure in which a twisting is additionally provided for the spray arrangement as in the case of the uniform arrangement as described earlier. As shown in FIG. 10, it is considered to make a spray arrangement in a state where the alignment R of the lower substrate 12 is intersected only by $\theta$ to the alignment F of the upper substrate 11 as in the uniform arrangement shown in FIG. 6. Then, as shown in FIG. 10, the liquid crystal molecules should be twisted at an angle formed by the trailing portion $T_F$ of the alignment F of the upper substrate 11 and the trailing portion $T_R$ of the alignment R of the lower substrate. Given this twist angle of the spray arrangement as $\omega$, the twist angle of spray arranged $\omega L$ is ($\theta + 180°$) if the e is taken counterclockwise in FIG. 10 because the e is positive, and the twist angle of the spray arrangement $\omega R$ is ($\theta - 180°$) which is a supplementary angle to it if the $\omega$ is taken clockwise because the $\omega$ is negative.

Figure 11:
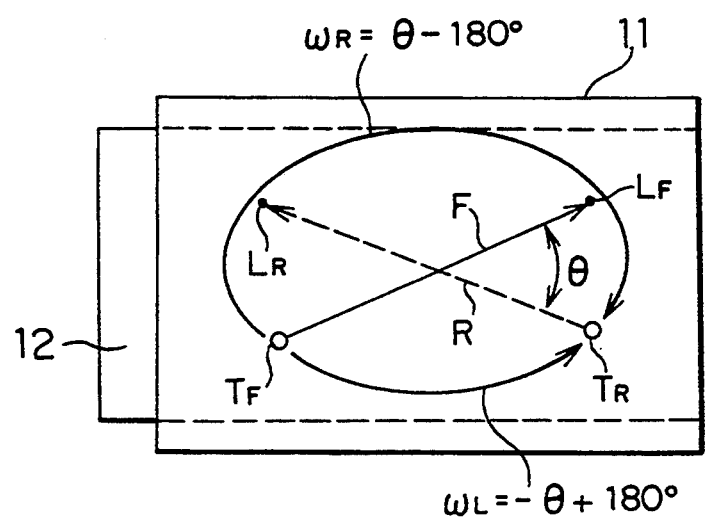
FIG. 11 is a plan view showing a spray twist arrangement.

Also, in consideration of a structure as shown in FIG. 11, the twist angle of the spray arrangement $\omega R$ is ($-\theta - 180°$) when the $\omega$ is taken clockwise because the $\omega$ is negative. If the $\omega$ is taken counterclockwise, the twist angle of the spray arrangement $\omega L$ is ($-\theta + 180°$) which is an supplementary angle to it because the $\omega$ is positive.

In these structures shown in FIG. 10 and FIG. 11, the twist angle of the stray arrangement $\omega$ can take either one of the four conditions, $(\pm\theta+180°)$ and $(\pm\theta-180°)$. As abovementioned, in the spray arrangement, too, it is possible to implement the twist arrangements, respectively, corresponding to the $+\theta$, $-\theta$ of the twist angle $\psi$ at the time of the uniform arrangement.

In consideration of the twist angle $\psi$ in a case of making the uniform twist arrangement, each of the $\omega$ described in conjunction with FIG. 10 and FIG. 11 is $\psi = +74$, $-\theta$, respectively. Here, it is meant that in a range where the angle $\theta$ is $0 \leq \theta \leq 90°$, it is impossible to implement the twisted spray arrangement unless the twist angles $\omega$ satisfy $(\pm\theta+180°)$ and $(\pm\theta-180°)$, respectively, when the $\psi$ is $\pm\theta$. In this case, the range of the value that the $\omega$ can take is $\omega = |\theta \pm 180°| = 90°$ to $270°$. This twist angle agrees with the practical solution of the conventional ST-LCD. That is, when a consideration is given to obtaining a twist angle equal to the twist angle of the conventional ST-LCD in the twisted spray arrangement, the twist angle of the uniform arrangement $\psi$ is $\pm\theta$, and the twist angle of liquid crystal $\omega$ is $(\pm\theta+180°)$ or $(\pm\theta-180°)$. This structure is a first feature of the LCD according to the present invention.

In a spray arrangement of the kind, the tilt directions (pretilt directions) of the liquid crystal molecules on the surfaces of the upper and lower substrates are opposite to each other themselves on the upper and lower surfaces, respectively. Therefore, from the viewpoint of the liquid crystal layer as a whole, there are two kinds of tilt directions of the liquid crystal molecules when a voltage is applied because the tilt direction depends on the one on the surface of the upper substrate or that of the lower substrate.

As a result, if the tilted electric field is applied in two different directions, the liquid crystal molecules can be easily tilted in the two different directions, and the light scattering effect, the effect genuine to the present invention, can be obtained easily.

On the contrary, if the aforesaid uniform arrangement is used, the pretilt directions are practically effectuated in the same direction on the upper and lower substrates. Therefore, in terms of the molecular arrangement, the tilt direction is obtainable only in one direction. As a result, in order to tilt the liquid crystal molecules in two different directions, it is necessary to apply an extremely strong tilted electric field. This is not practical. According to the results of experiments conducted by the present inventor et al, it is impossible to obtain the light scattering effect by the intended provision of walls unless a voltage of 60V or more is applied in the uniform arrangement even by use of the electrode structure of the present embodiment.

Here, with respect to the liquid crystal molecular arrangements, those which provide two tilt directions of liquid crystal molecules are the two arrangements given below in addition to the above-mentioned spray arrangement.

One of them is the liquid crystal arrangement having the pretilt angles $\alpha_0$ of $90°$ both on the upper and lower substrates so that its liquid crystal molecular arrangement is perfectly aligned in the vertical direction. In this case, a material having a negative dielectric anisotropy is used as the liquid crystal component.

If a voltage is applied to this liquid crystal component having the negative dielectric anisotropy, the liquid crystal molecules are tilted in the direction rectangular to the direction of the electric field. Therefore, when the tilted electric field formed in the two directions is applied as in the electric structure of the present invention, the liquid crystal molecules are tilted in the two directions (tilted downward).

That is, the condition that the pretilt angles $\alpha_0$ of the upper and lower substrates are both $90°$ means that the liquid crystal molecules on the surfaces of the upper and lower substrates do not have any directions in the plane directions of the substrates. As a result, there is no restriction on the tilt direction at all. In this case, the degree of freedom of tilt direction of liquid crystal molecules is infinite.

The other one of such two arrangements is the case where using the liquid crystal component having the negative dielectric anisotropy, the liquid crystal arrangement provides the pretilt directions which are inclined in the same direction from the vertical direction of the liquid crystal molecules (in general, this being called a bend arrangement). In this case, two or more directions of tilt down are created, that is, the degree of freedom is two or more.

However, even if the liquid crystal component of the negative dielectric anisotropy is used, the liquid crystal molecules are slightly tilted from the vertical direction ($90°$), resulting in only one degree of freedom when the upper and lower substrates form the uniformly tilted arrangement. Therefore, this is not within the objectives of the present invention.

Conceptually, the molecular arrangement of LCD of the present invention can be represented as shown in FIGS. 12A through 12F.

The twist direction, and degree of twist of this liquid crystal molecule can be controlled by the kind and amount of mixture of the chiral liquid crystal agent to be mixed in the liquid crystal. As specific materials, the following can be named:

For the chiral agent counterclockwise: octyl-2-oxy-4-(4'-n-hexyloxy)-benzol. For example, S-811 (manufactured by MERCK Japan Inc.); and For the chiral agent clockwise: 4-cyano-4'-(2-methylbutyl)-biphenyl. For example, CB-15 (manufactured by MERCK, Limited)

FIGS. 12A to 12F are views showing the influences given to the molecular arrangement when the electrode configurations differ respectively in a state where the alignment directions and pretilt angles $\alpha_0$ of the liquid crystal molecules are the same on the surfaces of the upper and lower substrates 11 and 12. FIGS. 12A to 12C represent a state when no voltage is applied. FIGS. 12D to 12F represent a state when a voltage is applied. Here, FIGS. 12A and 12D represent a state where an electric field is applied only in the thickness direction of the liquid crystal layer while the electrode configurations of the upper and lower substrates are equal.

The molecular position $d_0$ at which the liquid crystal molecule is in parallel to the substrates is provided in the mid point of the thickness of the liquid crystal layer. This position does not change as shown in FIG. 12D even when a voltage is applied form a power-supply $v_0$ to the electrodes 13 and 14. In FIG. 12B, the electrode 14 on the lower substrate 12 is formed in the left half of FIG. 12B, while the right half is made a region where no electrode is formed. The other electrode 13 on the upper substrate 11 is formed in the right half of FIG. 12B, while the left half is made a region where no electrode is formed. In this way, the electrodes 13 and 14 face no electrode regions, respectively.

When a voltage $v_0$ is applied, an electric field having traverse electric field component is added to the liquid crystal layer due to the mutual displacement of the electrodes. Then the molecules M form its molecular arrangement having an abrupt rise toward the right as shown in FIG. 12E due to the lines e of electric power generated with a component indicated by an arrow $E_R$ raised to the right in FIG. 12E.

On the other hand, in FIG. 12C, the electrode 14 of the lower substrate 12 is formed in the right half in FIG. 12C, while the left half is made a region where no electrode is formed, and the other electrode 13 on the upper substrate 11 is in the left half, while the right half, no electrode. The electrodes 13 and 14 face no electrode regions, respectively. As shown in FIG. 12F, an electric field having traverse electric field component is added to the liquid crystal layer due to the mutual displacement of the electrodes when a voltage $v_0$ is applied. Then the molecules M form its molecular arrangement having an abrupt rise toward the left as shown in FIG. 12F due to the lines e of electric power generated with a component indicated by an arrow $E_L$ raised to the left in FIG. 2F. In other words, the liquid crystal molecular arrangement of liquid crystal molecules depends on the formation of traverse electric field when a voltage is applied.

Therefore, as represented in FIG. 1A showing the present embodiment, the upper electrode 13 is made an electrode pattern where a plurality of stripe conductive sections 13a are arranged at equal intervals through the non-conductive sections 13b. Likewise, the upper electrode 14 is made an electrode pattern where a plurality of stripe conductive sections 14a are arranged at equal intervals through the non-conductive sections 14b. These electrodes are superposed to form a space between the substrates so that the conductive sections 13a or 14a on the one of the electrodes can face the non-conductive sections 14b or 13b on the other when these electrodes are opposed to each other. In this case, a rubbing process is conducted in order to allow the directions of the liquid crystal alignment on the upper and lower substrates to be in the same direction. As a result, when no voltage is applied, the liquid crystal can maintain the condition of the spray arrangement regularly, but when a voltage is applied, it generates the lines e of electric power which change its tilt directions alternately as shown in FIG. 1B because the tilted electric field having traverse electric field component is generated across the electrodes due to the displacement of the conductive sections on the upper and lower electrodes. The liquid crystal molecules M rise along the lines of electric power to provide its arrangement. Consequently, the liquid crystal arrangement is discontinued at the boundary between the tilted electric field toward the upper right and the tilted electric field toward the upper left. In this way, the wall line DL is generated.

If the conductive section and non-conductive section of the electrodes are finely formed in many numbers in a pixel, the direction in which the liquid crystal molecules rise can be divided finely. As a result, it is possible to generate many numbers of wall lines in one pixel. The light scattering can be created in this part. Since the light scattering range is 5 to 30 μm in width measured with the boundary as its center, it is possible to scatter light over the entire surface of one pixel if the size of the fine region is allowed to agree with the range of this value or divided into values smaller than such range. More specifically, it is preferable to made the width of the widest part of the conductive section 50 μm or less, and the width of the widest part of the non-conductive section 50 μm or less. Also, in a state where no voltage is applied, the liquid crystal is in the totally continuous arrangement, thus making it possible to obtain the state of light transmission. Therefore, according to the present invention, it is possible to control the electric field so that the state of light transmission can be obtained when no voltage is applied, while the state of light scattering can be obtained when a voltage is applied.

Here, for the present invention, it is preferable to make the pretilt angles equal on the upper and lower substrates because the tilt directions of the liquid crystal molecules are controlled by the direction of an electric field to be applied. In practice, it is desirable to make the difference between the tilt angles on the upper and lower substrate 0.5° or less.

With a microscopic view, the changes of molecular arrangement in each region are equal to the changes that the molecular arrangement can make, and the response speed takes a value in accordance with such changes. It is known that compared to the TN-LCD and STN-LCD having the conventional uniformed twist arrangement and the LCD of the homogeneous arrangement, the response speed is further enhanced. Therefore, the LCD of the present invention also makes it possible to obtain an extremely quick speed of responses.

Also, the LCD of the present invention can obtain the two states, light transmission and light scattering, with a slight changes of liquid crystal arrangement. As a result, there is no generation of hysteresis in the electro-optical characteristics.

Also, the combination of the molecular arrangement conditions can be differently made in the aforesaid boundaries of regions by the difference in the twist angles (including 0°) of liquid crystal. Therefore, various combinations are possible to implement various LCDs, such as those having abrupt or smooth electro-optical characteristics. However, if the twist angle is made larger than 270°, there are some cases where the molecular arrangement is stored in a state that a voltage is applied even when it is switched over to the state that no voltage is applied. This is not desirable because such a storage leads to the generation of hysteresis in the electro-optical characteristics after all. Therefore, it is preferable to set the twist angle at 0° to 270° for liquid crystal of the LCD according to the present invention.

Also, the LCD of the present invention is produced with its twist angle at 0°, and then, the combination is arranged so that between the two polarizers which are rectangular to each other, each of the rubbing directions (conceivably, on the cell plane, these are in the same direction on the upper and lower substrates), and the absorption axis of one of the polarizers can be paralleled. In this way, it is possible to obtain a display of a transmission type even when a source of scattering light is employed. In this case, the display is in an optical mode utilizing multiple refraction effects, hence reducing the aforesaid transmittance. However, it is possible to obtain the effect that the LCD has a lesser degree of dependence of viewing angles because the state of light transmission can be implemented by the state of liquid crystal layer having light scattering. Particularly, when the gradation display is executed, there is no possibility that the inverted display is generated, thus making it possible to obtain the displaying characteristics superior to the conventional TN-LCD or the like as a display of a direct viewing type.

Also, the LCD of the present invention can create the light scattering state of the liquid crystal layer with a slight changes of the liquid crystal arrangement. The applied voltage can be an extremely small value. Therefore, an advantage is obtained that it is possible to drive the LCD at a low voltage.

Now, in conjunction with FIGS. 13A to 13C, FIGS. 14A to 14C, and FIGS. 15A to 15c, the description will be made of the electrode structures and the structures of molecular arrangement of LCDs according to several embodiments of the present invention.

Figure 13A:
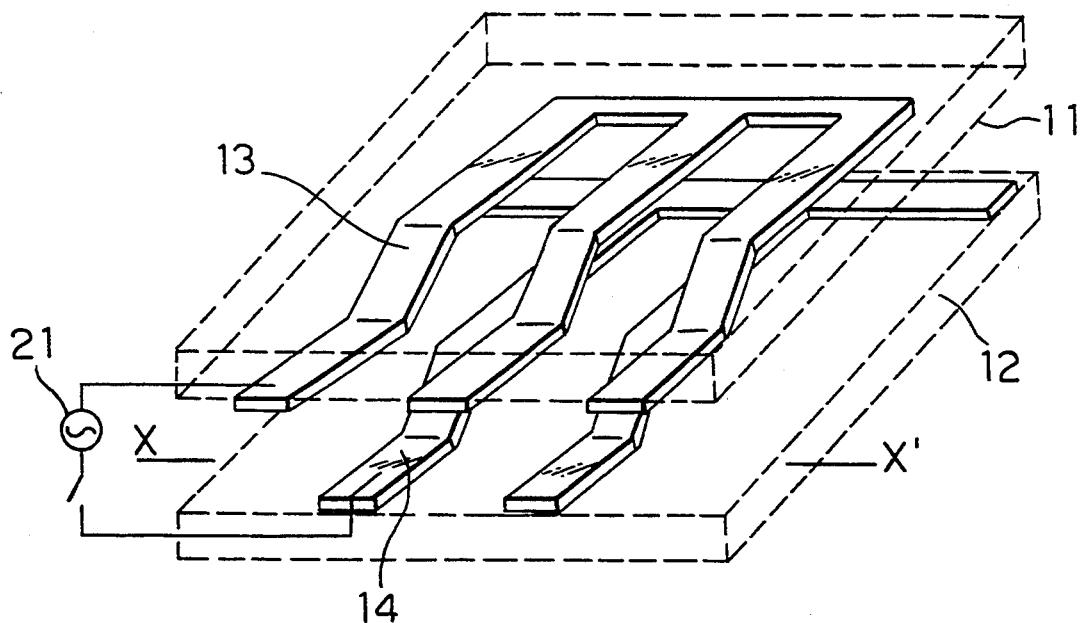
FIG. 13A is a perspective view showing the electrode structure of LCD according to an embodiment.
Figure 13B:
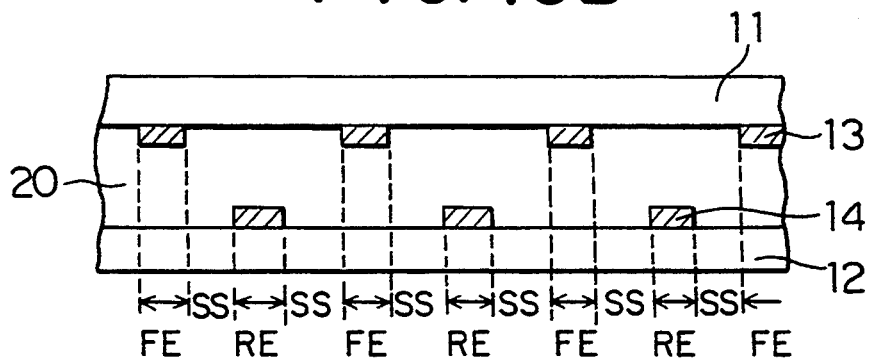
FIG. 13B is a view showing a cross-section taken along line X—X in FIG. 13A.
Figure 13C:
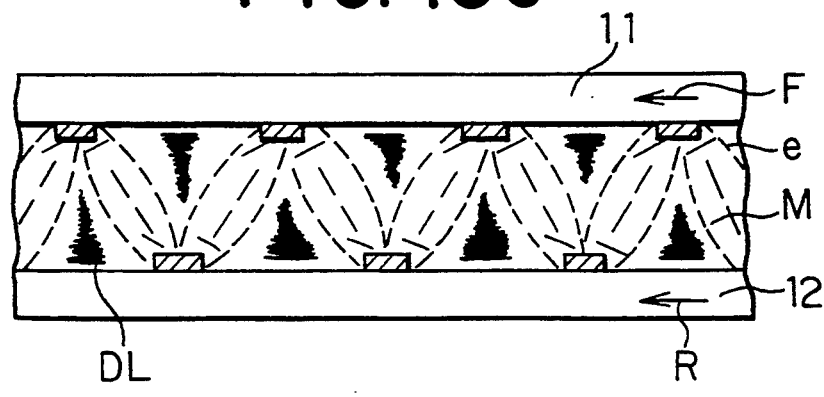
FIG. 13C is a view showing a state of liquid crystal molecules when a voltage is applied.
Figure 14A:
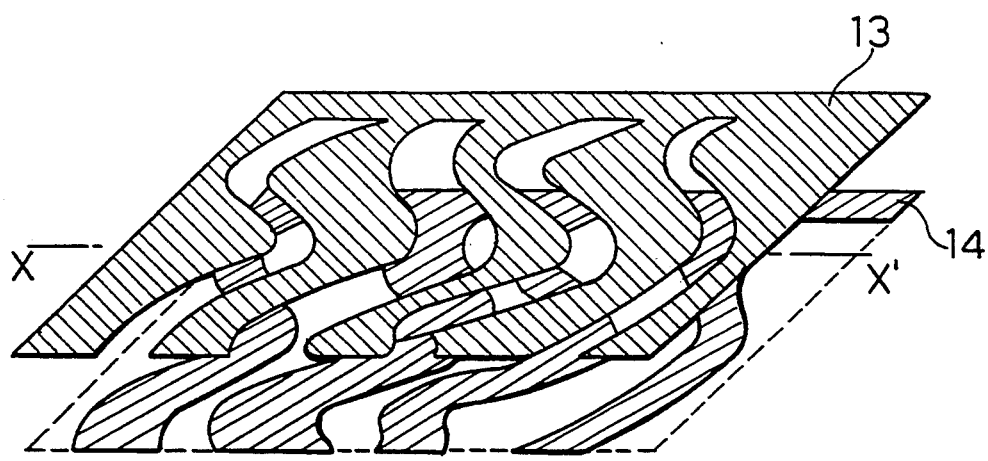
FIG. 14A is a perspective view showing the electrode structure of LCD according to an other embodiment.
Figure 14B:
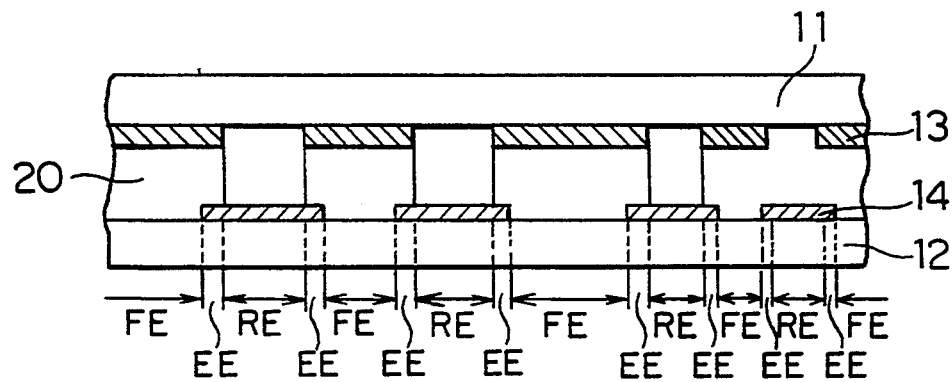
FIG. 14B is a view showing a cross-section taken along line X—X in FIG. 14A.
Figure 14C:
FIG. 14C is a view showing a state of liquid crystal molecules when a voltage is applied.
Figure 15A:
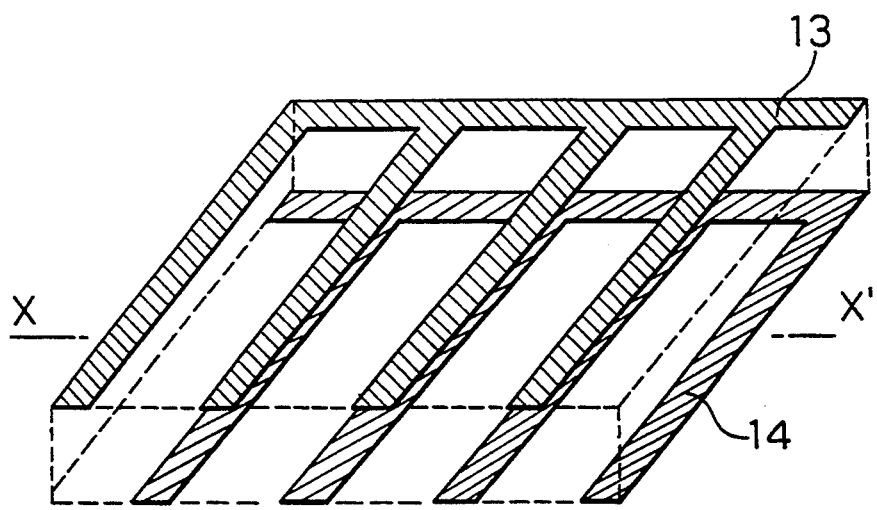
FIG. 15A is a perspective view showing the electrode structure of LCD according to still an other embodiment.
Figure 15B:
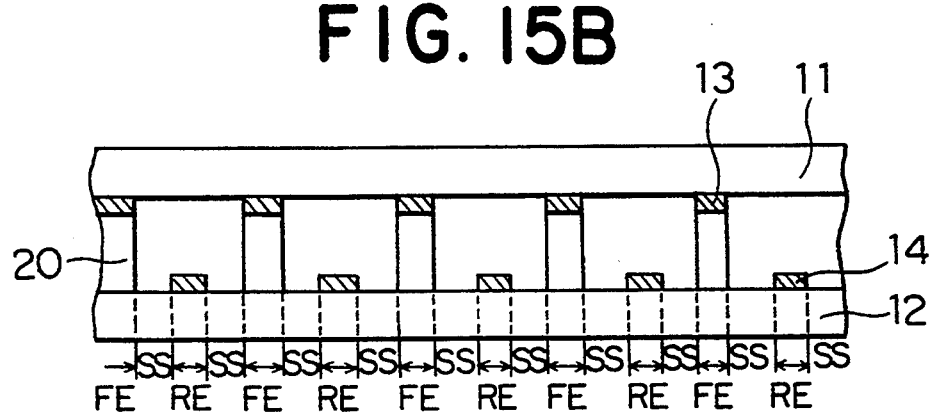
FIG. 15B is a view showing a cross-section taken along line X—X in FIG. 15A.
Figure 15C:
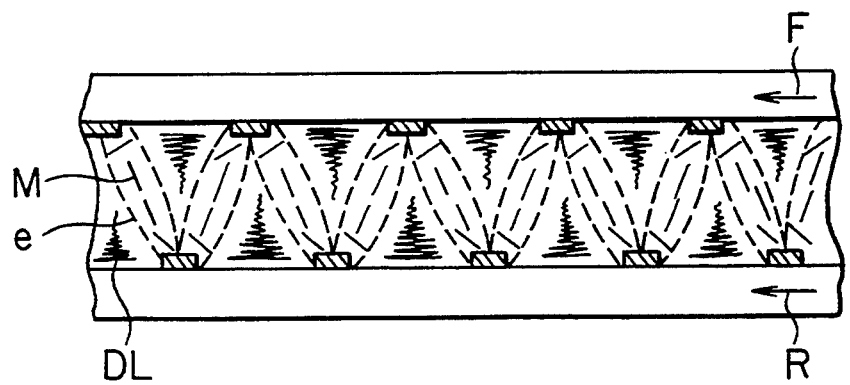
FIG. 15C is a view showing a state of liquid crystal molecules when a voltage is applied.

FIGS. 13A to 13C are views showing most suitably the embodiment of the electrode structure and the structure of molecular arrangement according to claim 5. FIGS. 14A to 14C are views showing most suitably the embodiment of the electrode structure and the structure of molecular arrangement according to claim 6. FIGS. 15A to 15C are views showing most suitably the embodiment of the electrode structure and the structure of molecular arrangement according to claim 5. Also, FIG. 13A, FIG. 14A, and FIG. 15A are perspective views showing the electrode structures. FIG. 13B, FIG. 14B, and FIG. 15B are views showing the cross-sections of the electrode structures. FIG. 13C, FIG. 14C, and FIG. 15C are views showing the cross-sections of liquid crystal molecular arrangement when an electric field is applied.

Figure 16:
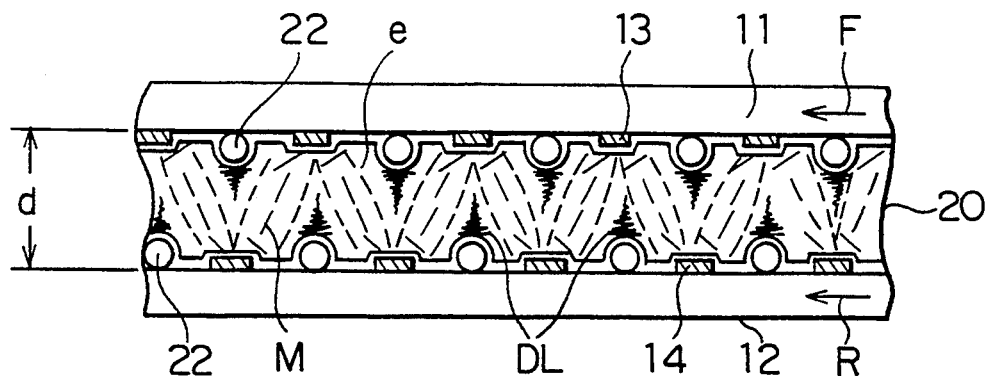
FIG. 16 is a view illustrating another embodiment of LCD and showing a state of liquid crystal molecules when a voltage is applied.

Also, FIG. 16 is a view showing the cross-section of an device where the structure of LCD according to claim 11 is applied to the embodiments represented in FIG. 13C, FIG. 14C, and FIG. 15C.

In each of these figures, the upper and lower stripe electrodes 13 and 14 are arranged respectively for each unit of one pixel on each of the opposing surfaces of the upper and lower substrates made of glass and others. An arrow F indicates the rubbing direction of the upper substrate 11 while an arrow R indicates the rubbing direction of the lower substrate 12. Dotted lines e represent the lines of electric power generated when a voltage is applied from a power-supply 21 (see FIG. 13A) to the upper and lower electrodes 13 and 14. A reference mark DL designates a wall which is generated.

In FIG. 13B and FIG. 15B, the width of the upper electrode 13 is defined as FE when observed it from the upper substrate 11 side in the direction of the normal line of the substrate; the width of the lower electrode 14 as RE; and the width of a space between these electrodes, as SS. Further, in FIG. 14B, the width of a part where the upper electrode 13 is not superposed with the lower electrode 14 as FE when observed it from the upper substrate 11 side in the direction of the normal line of the substrate; the width of a part where the lower electrode 14 is not superposed with the upper electrode 13, as RE; and the width of the part where these electrodes are superposed, as EE.

Also, in any one of the figures, a spacing agent to be applied between substrates (spacer) or any other members which are not directly relevant to the features of the present invention will be omitted.

Further, FIG. 13A to FIG. 15C, and FIG. 1B of the present invention illustrate the configuration in which the molecular arrangement of liquid crystal is made as the so-called spray arrangement. The structure of electrodes shown in FIG. 1A and FIG. 1B are such that the conductive section and non-conductive section face each other across the upper and lower substrates as shown in it, and that on each of the substrates, the conductive section and non-conductive section are alternately arranged to constitute the structure (an electrode structure of the kind is defined as "nest").

As clear from the comparison between FIG. 1B and FIG. 13A to FIG. 15C, the electrode structure of the present invention is such that as compared with the "nest" structure of the electrodes shown in FIG. 1B, the structure represented in FIG. 13B is arranged in such a manner that between the parts where the conductive section and non-conductive section are opposed to each other across the upper and lower substrates (the portions designated by reference marks FE and RE), a part where both the upper and lower substrates provide the non-conductive sections (a portion designated by a reference mark SS). Therefore, in the cross-sectional configuration of the electrode structure, the aforesaid portions are arranged in order of FE·SS·RE·SS·FE·SS·RE·SS·FE·SS·... as shown in FIG. 13B. For the convenience sake, an electrode structure of the kind is defined as "spaced nest".

Also, an electrode structure shown in FIG. 14B is the one in which the part where the conductive sections on both the upper and lower substrates are superposed (the portion designated by a reference mark EE) is provided between the parts where the conductive section and non-conductive section are opposed to each other across the upper and lower substrates (the portion FE or RE). Therefore, in the cross-sectional configuration of the electrode structure, the aforesaid portions are arranged in order of FE·EE·RE·EE·FE·EE·RE·EE·FE·EE·... as shown in FIG. 14B. For convenience' sake an electrode structure of the kind is defined as "superposed nest".

Also, the electrode structure shown in FIG. 15B is a variation of the electrode structure shown in FIG. 13B. This one is such that the electrode configuration in the plane direction of the device presents the so-called striped shape.

In other words, the electrode structure shown in FIG. 15B represents the one in which the conductive section and non-conductive section are linearly configured and arranged in parallel. The same configuration can be conceivable with respect to the superposed nest structure shown in FIG. 14B. In this respect, however, any representation in the form of figures will be omitted. These electrode structures thus configured in a "spaced nest" and "superposed nest" modes and further configured with the so-called stripe on the plane direction of the device are defined respectively as "spaced stripe nest" and "superposed stripe nest" for convenience' sake. Conversely, the liquid crystal molecular arrangement of the LCD proposed by the present invention has the features as shown in FIG. 14B, and if many parts are provided in the electrode structure to make the tilt orientations of molecules conspicuously different in addition to the liquid crystal molecular arrangement thus characterized by the present invention, there is no need for the plane configuration of the electrode structure should be arranged to provide such a regulated strip shape as shown in FIG. 15B. Despite all this, the electrode structures of the "spaced stripe nest" and "superposed strip nest" modes shown in FIG. 15B are included as one of the features of the present invention because these electrode structures are found to provide the features of its own which is different from those of the electrode structure shown in FIG. 14B.

Figure 17:
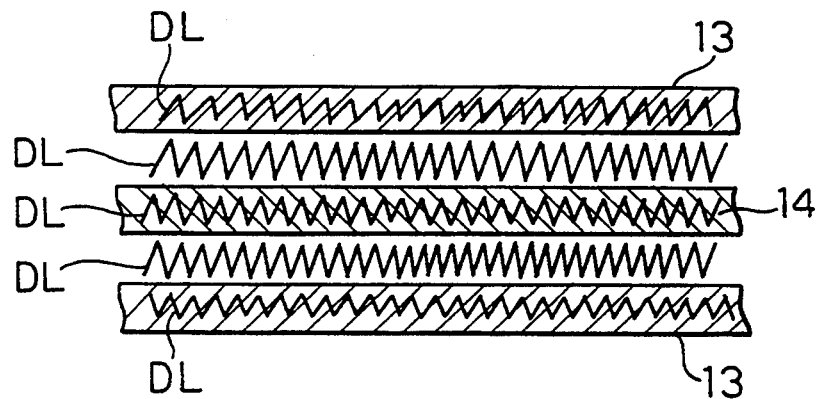
FIG. 17 is a plan view showing the appearing shape of walls show in FIG. 13C.

Now, the description will be made of the feature and operation of each of the electrode structures having those four particular structures. Compared to the "nest" structure, the "spaced nest" and "spaced strip nest" are weaker in its strength to the extent that these two structures are provided with the non-conductive sections designated by the reference mark SS in FIG. 13B and FIG. 15B. This results in a slight increase in the driving voltage, but in a smoother curve in the electro-optical characteristics in practice. Therefore, when a finer gradation display is required, these structures make its driving easier. Also, the non-conductive section designated by the reference mark SS provides a margin in the alignment (matching) of the electrodes on the upper and lower substrates. This results in a significant improvement in productivity. Also, as shown in FIG. 14B, the "superposed nest" and "superposed stripe nest" structures are capable of obtaining the tilted electric field by the application of a low voltage as compared to the "spaced nest", "spaced stripe nest", and "nest" structures. In practice, therefore, the driving voltage can be made lower. However, since the component of the electric field, which is applied in the direction of normal line, occurs in the part EE, the strength of light scattering becomes slightly low. Nevertheless, to the extent that these structures have the conductive section designated by the reference mark EE as in the cases of "spaced nest" and "spaced stripe nest", a margin can be provided for the alignment (matching) of the electrodes on the upper and lower substrates. Also, compared to the "spaced nest" and "superposed nest", the "spaced stripe nest" and "superposed stripe nest" structures make its wall (point at DL in FIG. 13C, FIG. 14C, and FIG. 15C where orientation is discontinued) more corrugated in the appearing configuration as shown in FIG. 17. This configuration enhances the strength of light scattering more than the linear configuration. As the results of various experiments, it is confirmed by the inventor hereof et al that more the electrode pattern is regulated in the striped form, more corrugated becomes its configuration. From this event, these structures of "spaced stripe nest" and "superposed stripe nest" can be regarded as those structures which can obtain a greater strength of light scattering as its feature after all.

As has been above-mentioned, the various structures of electrodes present its own characteristics, respectively, and can serve as means for solving the aforesaid problems encountered in the prior art. The description has been made so far of the spray configuration of liquid crystal molecular arrangement which does not provide any twist for the liquid crystal molecular arrangement. Needless to mention, however, that the same effect as above can be obtained if only the tilt direction of the liquid crystal molecules has two or more degree of freedom of its molecular arrangement.

Now, when the aforesaid walls are generated in the various electrode structures and molecular arrangements according to the present invention, the liquid crystal molecules can continue to maintain the state of the molecular arrangement where the walls are generated even if a voltage is continuously applied because the structure is arranged so that the tilted electric fields are contrary to each other per fine region. It is fundamentally difficult for the liquid crystal molecular arrangement to change its configuration very finely. In other words, only with the external force such as an electric field or a magnetic field to be applied, it is not good enough to supply a sufficient force to maintain such difficult configuration of the molecular arrangement. In order to solve a problem of the kind, the inventors have found a solution by the provision of fine grains having the length in the thickness direction of the liquid crystal layer, and shorter than the thickness d of the liquid crystal layer, which are mixed in the space between both substrates or by the provision of protuberance arranged on at least one of the substrates, having its height in the thickness direction of the liquid crystal layer and shorter than the space D between the electrodes (this space being equal substantially to the thickness d of the liquid crystal layer).

FIG. 16 is a view showing this structure. As shown in FIG. 16, the structure is formed by the addition of grains 22 which are smaller than the thickness d of the liquid crystal layer. It has been found that if grains or protuberance are provided in the liquid crystal layer 20 in such a manner as this, and these grains or protuberance are present in the locations where the aforesaid walls appear, it is possible to change the aforesaid configuration of arrangement finely, and maintain the state of the molecular arrangement thus changed, that is, maintain the state of molecular arrangement where many numbers of walls are allowed to appear. Since the fine grains or protuberance provide the function to maintain many numbers of walls, these are called "wall supporting devices". As means for obtaining these functions, it may be possible to mix fine grains having the same size as the thickness of the liquid crystal layer sufficiently enough in the liquid crystal layer (that is, the mixture of spacing agent between the substrates), besides the methods disclosed in the present invention. In this case, however, it is necessary for the maintenance of many walls to mix a good quantity of the spacing agent between the substrates. This mixture may produce an adverse effect when the light transmission state should be obtained. More specifically, the adverse effect is produced by the light scattering resulting from the spacing agent between the substrates, and also, by the light scattering due to the liquid crystal molecular alignment on the surface of the spacing agent between the substrates. In order to reduce such adverse effect, the present invention employs the fine grains or protuberance characterized in having smaller size than the thickness d of the liquid crystal layer as the wall supporting devices as above-mentioned. The inventor hereof et al have confirmed by various experiments that using fine grains or protuberance smaller than the thickness d of the liquid crystal layer, the light scattering due to the provision of these extra devices can be reduced to the level where no problem is encountered.

In this respect, the inventor hereof et al have confirmed that in addition to the aforesaid fine grains or protuberance, the steps which are inevitably provided for TFT and MIM substrates (the steps created by difference in the thicknesses of wired electrodes or semiconductor layers) can provide the same function as that of the wall supporting devices in the vicinity of the steps themselves as above-mentioned.

Figure 18:
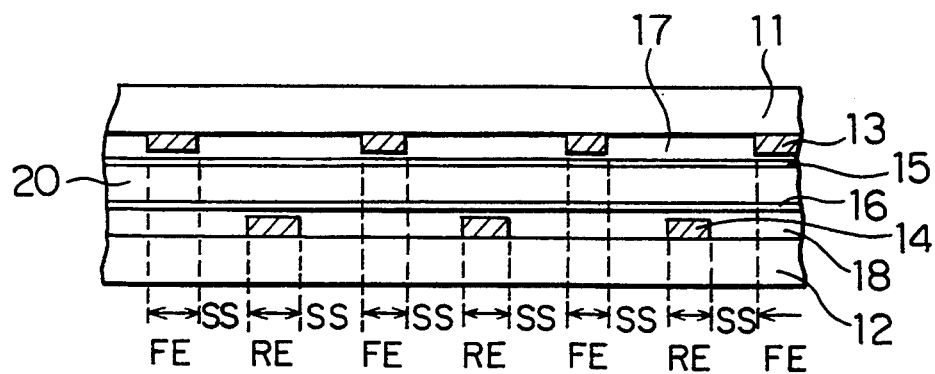
FIG. 18 is a view illustrating an embodiment of LCD, and showing a cross-section of liquid crystal cell.
Figure 19:
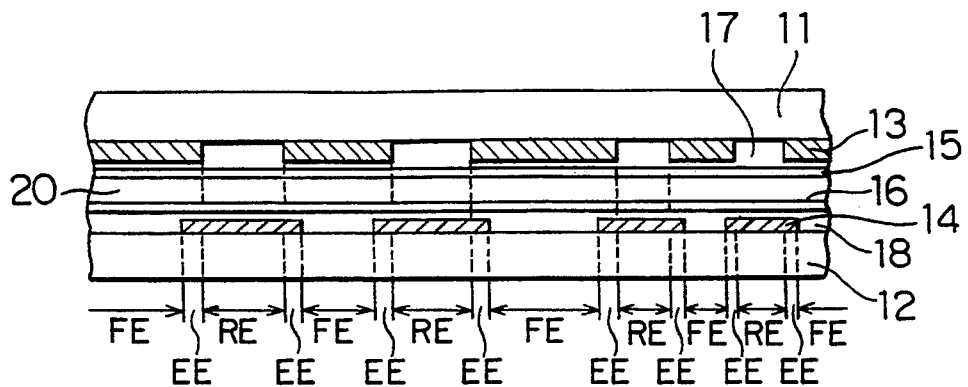
FIG. 19 is a view illustrating another embodiment of LCD, and showing a cross-section of liquid crystal cell.
Figure 20:
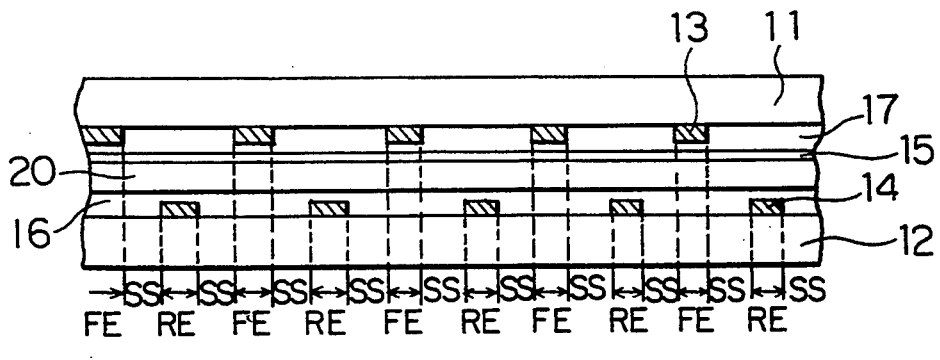
FIG. 20 is a view illustrating still another embodiment of LCD, and showing a cross-section of liquid crystal cell.

Further, in FIG. 18, FIG. 19, and FIG. 20, this structure will be represented. An upper transparent insulating film 17 is formed on the upper electrode 13 or the upper electrode 13 and protuberance, while a lower transparent insulating layer 18 is formed on the lower electrode or the lower electrode and protuberance, hence making it possible to enhance the transmittance and contrast when no voltage is applied. In this respect, alignment films 15 and 16 are formed on these transparent insulating layers. In FIG. 20, however, the lower transparent insulating layer is not provided.

The electrodes 13 and 14 are formed by ITO, the refractive index of which is approximately 1.9 and higher than those of the substrate and alignment film which are approximately 1.5. Here, the refractive index of the transparent insulating film is selected to be equal or close to the refractive index of the electrode material. In practice, it is preferable to make such index 0.9 to 1.1 times the refractive index of the electrode material. The description of reasons will be given below.

Figure 21:
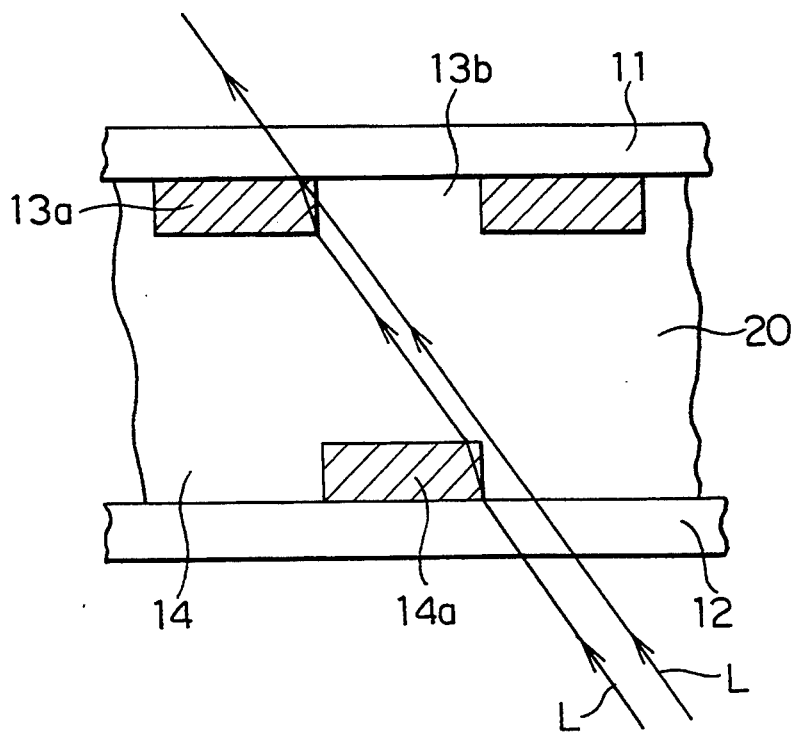
FIG. 21 is a view illustrating the function of a transparent insulating film.

As shown in FIG. 21, there is a great difference between the refraction index of ITO and that of other materials, that is, between the substrates 11 and 12, and the liquid crystal layer 20. On the other hand, since the pixel electrode is divided into the fine regions of the conductive sections 13a and 14a and the non-conductive sections 13b and 14b, optical paths in the pixel electrode are superposed due to the difference in the refraction indices of the conductive sections and non-conductive sections. As a result, light interference occurs inevitably. Therefore, if only such a light interference can be removed, it is possible to enhance the transmittance and contrast when no voltage is applied.

The light interference occurs due to the great difference in the refractive indexes of the material of the pixel electrode and other materials, and also, due to the fine division of the regions of the conductive and non-conductive sections in the pixel electrode. As a result, the degrees of refraction of the incident light are caused to differ in the conductive sections and non-conductive sections, leading to the light interference. Therefore, in order to prevent the light interference from occurring between the pixel electrodes, the incident light should only be refracted equally in the conductive and non-conductive sections in the pixel electrode. To this end, a transparent insulating film having substantially the same refractive index as that of the material of the pixel electrode should be coated on the pixel electrode. Then the light incident upon the non-conductive section in the pixel electrode can be refracted equally to the light incident upon the conductive section, hence making it possible to suppress the light interference. The pixel electrode can be formed by a transparent conductive device. In practice, it can be formed by ITO. Therefore, it is good enough if only a transparent insulating film having substantially the same refractive index as that of ITO should be used in this respect. In other words, if it is within in a range of 0.9 to 1.1 times the refractive index of the electrode material, the reduction of transmittance due to the light interference does not take place in most cases. Also, if the thickness of the transparent insulating film is more than a half that of the transparent electrode layer such as ITO, it is possible to obtain a sufficient effect.

Hereinafter, with reference to the accompanying drawings, the specific description will be made of the embodiments of LCDs according to the present invention.

EMBODIMENT 1

FIG. 1A is a perspective view showing the patterns of the upper and lower electrodes according to the present embodiment. FIG. 1B is a view showing the cross-section of the liquid crystal cell where the electrodes are opposed to each other.

A transparent common electrode 13 made of ITO is formed over one of the entire surfaces of the upper substrate 11 made of glass. On the surface thereof, an upper alignment film 15 of polyimide (AL-3046 manufactured by Nippon Synthetic Rubber Co.) is laminated. On the one face of the lower electrode 12 made of glass, the pixel electrode 14 made of ITO is formed. On the surface thereof, the lower alignment film 16 of polyimide (AL-3046 manufactured by Nippon Synthetic Rubber Co.) is laminated. The pixel electrode 14 the size of which is 300 $\mu$m×300 $\mu$m per pixel is arranged in the form of mosaic for each of the pixel units. The pretilt angles of the upper and lower alignment films are 3°.

The upper electrode 13 is a pattern having a plurality of slits of 20 $\mu$m wide per pixel, that is, non-conductive sections 13b, and the conductive sections 13a of 20 $\mu$m wide arranged at pitches of 40 $\mu$m in the form of stripes. Six conductive sections 13a are formed for one pixel of 300 $\mu$m wide.

Likewise, the opposing lower electrode 14 has a pattern in which the conductive sections 14a of 20 $\mu$m wide and non-conductive sections 14b of 20 $\mu$m wide arranged at the same intervals. Six conductive sections 14a are formed within a width of 300 $\mu$m.

In a state where the upper and lower substrates face each other, the conductive sections of these electrodes shift themselves by 20 $\mu$m each other, and the conductive sections 13a or 14a of one of electrodes face the non-conductive sections 14b or 13b of the other electrode.

The lower electrode 14 has the TFT switching device 19, and is connected to the gate line 23 and the signal line 24.

The alignment directions F and R of the upper and lower alignment films 15 and 16 are set so that these directions are rectangular to the conductive sections of the electrodes, and in the same direction as shown in FIGS. 1A and 1B. Also, the space between the upper and lower substrates is arranged to be 10 $\mu$m to form a liquid crystal cell. In this space between the substrates, nematic liquid crystal having positive dielectric anisotropy (ZLI-3926 manufactured by MERCK Japan INC.) is filled to provide a liquid crystal layer 20. This liquid crystal has a birefringence ($\delta$n) of as large as 0.2030. With such a large birefringence ($\delta$n) and the selection of the liquid crystal layer having a large layer thickness, the light scattering of LCD can be enhanced.

To the LCD of the present invention thus obtained, a voltage is applied from a power-supply 21 through TFT 19, and the electro-optical characteristics (transmittance-applied voltage curve) are measured. With the applied voltage, an electric field having traverse electric field component is generated across the electrodes. Then, since the direction of the traverse electric field component changes in a fine region of one pixel, the liquid crystal molecules M of the liquid crystal layer 20 change its arrangements in accordance with the electric field. Therefore, many numbers of wall lines DL are generated at the boundaries in the liquid crystal arrangement. In this way, the state of light scattering is created.

Figure 23:
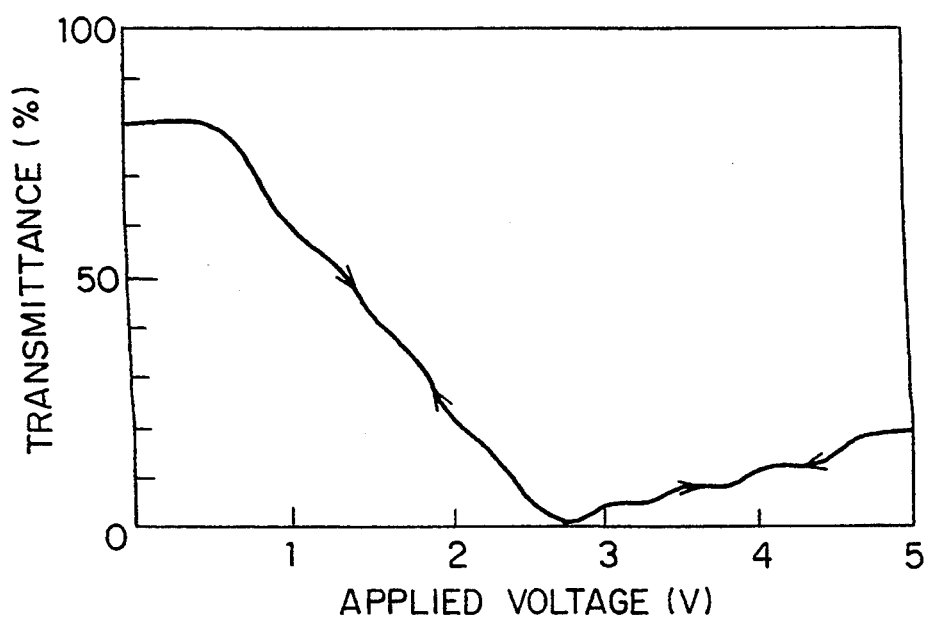
FIG. 23 is a view showing the relationship of the transmittance and applied voltage curve according to the embodiment 1.

In order to obtain the transmittance-applied voltage curve, He-Ne laser beam is provided to be incident upon the LCD for the measurement of transmittance. The result of measurement is shown in FIG. 23. In this respect, the spot diameter of the beam is 2 mm. The transmitted leaser beam is detected by a photodiode positioned in a location 20 cm away from the LCD. Also, the applied voltage is gradually increased from 0

V to 5 V, and then, decreased gradually from 5 V to 0 V. In a state where no voltage is applied (0 V applied), the transmittance is approximately 80% and indicates a bright transmittance characteristic. Also, at an applied voltage of 2.8 V, the minimum transmittance is 0.4%, and a good light scattering condition is obtainable. Also, as clear from FIG. 23, there is no hysteresis at all in the electro-optical characteristics. Also, at an applied voltage of 2.8 V and 0 V, the response speeds are measured. The result is that an extremely quick speed of response is obtainable, that is, 7 msec at rising, and 25 msec at decaying.

EMBODIMENT 2

Figure 22A:
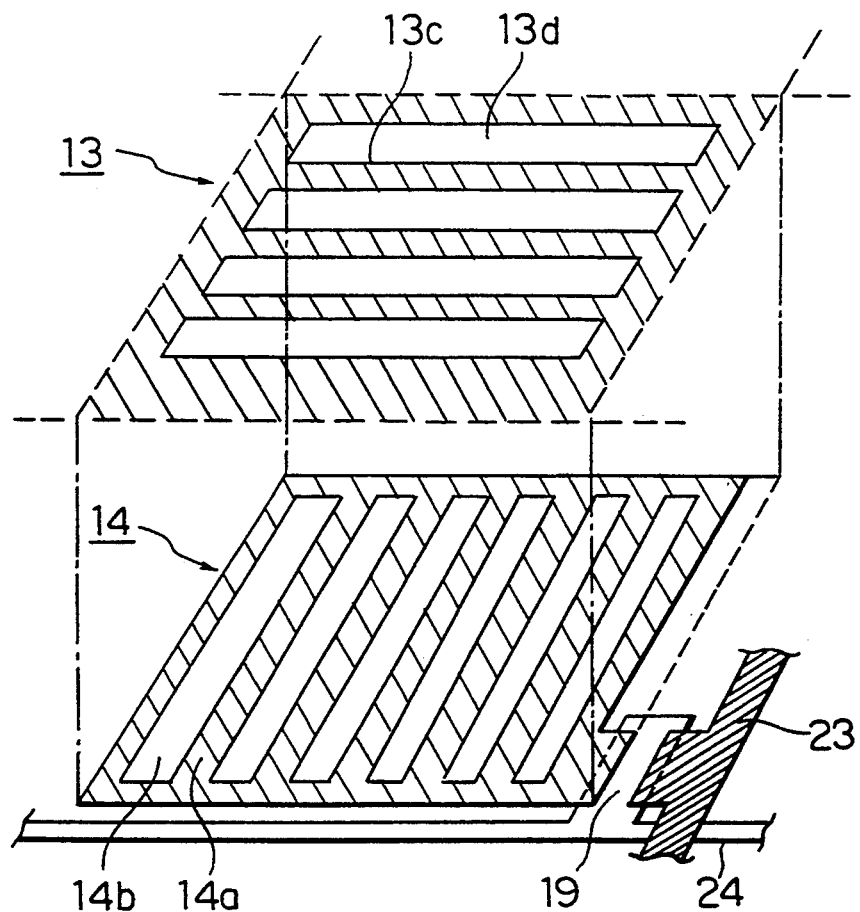
FIG. 22A is a view illustrating an embodiment of electrodes.
Figure 22B:
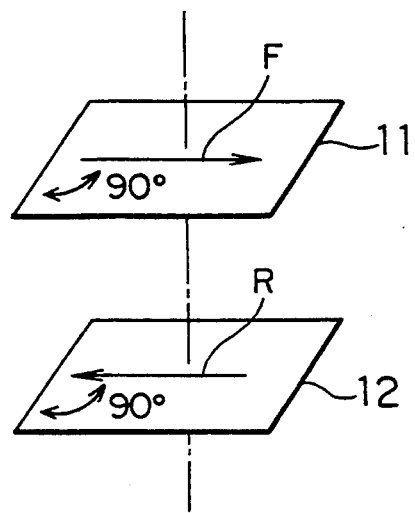
FIG. 22B is a view showing the alignment directions of the upper and lower substrates.

The present embodiment is shown in FIG. 22A and FIG. 22B.

As shown in FIG. 22A, the patterns of the conductive sections 13c and non-conductive sections 13d of the upper electrode 13, and the conductive sections 14a and non-conductive sections 14b of the lower electrode 14 are rectangular to each other in one pixel. With the exception of these patterns of conductive sections, the structure of the present embodiment is the same as that of the embodiment 1. Here, the same parts as those appearing in the embodiment 1 are designated by the same reference numerals. However, for the liquid crystal layer, a liquid crystal component is used by adding the chiral agent of counterclockwise twist (S-811 manufactured by MERCK Japan, Inc.) to the liquid crystal of positive dielectric anisotropy (ZLI-3926 manufactured by MERCK Japan, Inc.). Also, as shown in FIG. 22B, the alignment directions F and R of the upper and lower substrates are arranged to shift by 180°, and the liquid crystal molecules are arranged in a twisted spray of 180°. In this structure, there are generated a region where the conductive sections 13c and 14a of the upper and lower electrodes are superposed, and a region where the conductive sections 13c or 14a of one of the electrodes face the non-conductive sections 14b or 13b of the other electrode. However, the traverse electric field component, which is created by the application of a voltage, is generated complicatedly to affect and disturb the liquid crystal molecular arrangement. As a result, it is possible to obtain a sufficient light scattering in the fine region of one pixel at an extremely quick speed of response.

EMBODIMENT 3

Figure 24A:
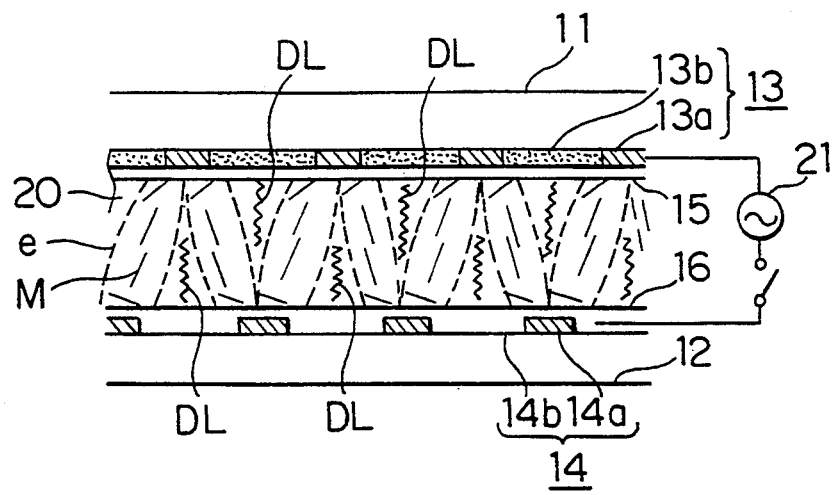
FIG. 24A is a view illustrating an embodiment and showing a state of the structural arrangement of electrodes and liquid crystal molecules of LCD.
Figure 24B:
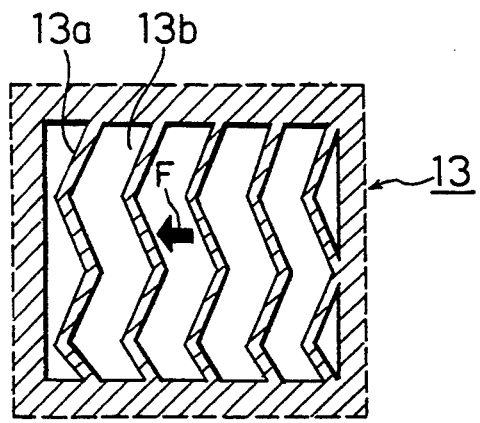
FIG. 24B is a plan view showing an upper electrode (common electrode).
Figure 24C:
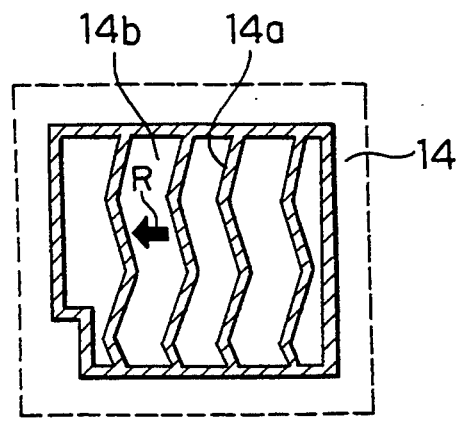
FIG. 24C is a plan view showing a lower electrode.

FIG. 24A is a view showing the cross-section of the liquid crystal cell in which the electrodes are opposed to each other according to the present embodiment. FIG. 24B illustrates a pattern of the upper electrode in one pixel region. FIG. 24C illustrates a pattern of the lower electrode in one pixel region.

As shown in FIG. 24A and FIG. 24B, there is used for the upper substrate 11, a glass substrate forming on it a common electrode 13 formed by ITO comprising a bending stripe pattern of non-conductive sections 13b and conductive sections 13a for each pixel. In this respect, a chrome black matrix is formed over the entire area of non-pixel sections. As shown in FIG. 24A and FIG. 24B, there is used for the lower substrate 12, a glass substrate forming on it a switching device formed by a common electrode 14 comprising a bending stripe pattern of non-conductive sections 14b and conductive sections 14a for each pixel, and TFT. As shown in FIG. 24B, in the pattern of the upper electrode, the width of conductive sections in the direction rectangular to the extended direction of stripes is set at 5 μm; the width between the vertices of the conductive sections, 10 μm; and the width of the non-conductive sections, 10 μm. Also, the pattern of the lower electrode shown in FIG. 24C, the width of the conductive sections is set at 5 μm while the width of the non-conductive sections, 10 μm.

On the electrode patterns on the substrates, alignment films 15 and 16 (Product Name: SE-7120 manufactured by Nissan Chemical Industrial Co.) (the measured value of pretilt angles: 6°) are formed, and a rubbing process is given to the surfaces thereof in the directions F and R shown in FIG. 24B and 24C. Then, after spraying grains (Product Name: Micropearl SP manufactured by Sekisui Fine Chemical Co.) (the granular diameter: 7.5 μm) by a dry spraying method with a spray density of 100 pieces/mm² on the lower substrate side as spacing agent for substrates so that the thickness of the liquid crystal layer becomes 7.5 μm, a liquid crystal component of positive dielectric anisotropy (Product Name: ZLI-3926 manufactured by MERCK Japan, Inc.) ($\Delta n = 0.2030$) is held between these substrates. In this way, the LCD of the present embodiment is obtained with the electrode structure of the "spaced nest" as described earlier. Here, the reason that the thickness of the liquid crystal layer is made large, and the induced anisotropy is set in a large amount for the liquid crystal component is to hence the light scattering capability in a state of light scattering.

With the method described in the embodiment 1, the electro-optical characteristics (transmittance-applied voltage curve) of the LCD thus obtained is measured by applying a voltage through TFT. The result of measurement is shown in FIG. 27. In a state where no voltage is applied (0 V applied), the transmittance is approximately 80% and indicates a bright transmittance characteristic. Also, at an applied voltage of 3.1 V to 3.9 V, the minimum transmittance is 0.4%, and a good light scattering condition is obtainable. Also, as clear from FIG. 27, there is no hysteresis at all in the electro-optical characteristics. Also, at an applied voltage of 3.1 V and 0 V, the response speeds are measured. The result is that an extremely quick speed of response is obtainable, that is, 6 msec at rising, and 18 msec at decaying.

Then, a voltage is applied through the TFT on the lower substrate to examine the maintaining condition of the aforesaid walls by observing the molecular arrangement by use of a polarizing microscope and by measuring the state of light scattering by the transmittance measurement. For the present embodiment, it is confirmed that the initial arrangement of walls is maintained even after one hour when an applied voltage of 3.1 V is continuously supplied.

EMBODIMENT 4

Using the same substrates 11 and 12 as the embodiment 3, a processing agent (Product Name: ODS-E (Octadecyltrietoxysilane alcohol solution) manufactured by Tisso Ltd.) for vertical alignment is employed for the alignment films 15 and 16 to give the vertical alignment treatment to the substrates. Here, the vertical alignment treatment is conducted by dipping each substrate into the aforesaid alcohol solution. The pretilt angles thus obtained are 90° both for the upper and lower substrates. With the exception of the use of nematic liquid crystal material presenting negative dielectric anisotropy (Product Name: ZLI-4850 ($\Delta n = 0.208$) manufactured by MERCK Japan, Inc.) for the liquid crystal component, the LCD of the present embodiment is obtained under the same conditions and by use of the same materials as the embodiment 3. Each of the characteristics is measured as in the embodiment 3 with an excellent result which is substantially equal to the embodiment 3 as shown in FIG. 27.

EMBODIMENT 5

Figure 25A:
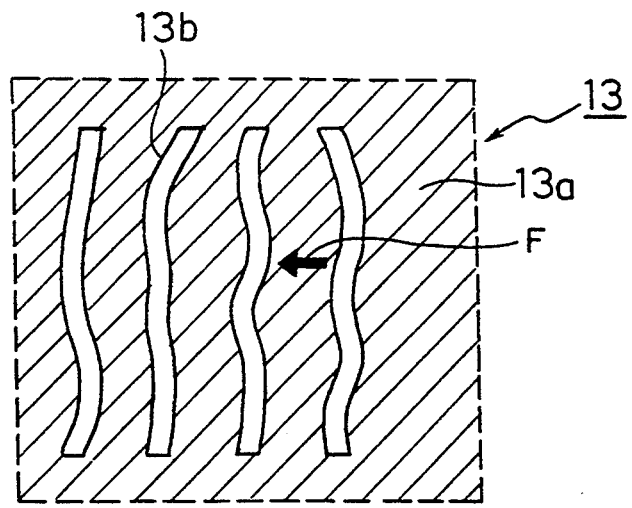
FIG. 25A is a view illustrating another embodiment, and a front view showing an upper electrode (common electrode).
Figure 25B:
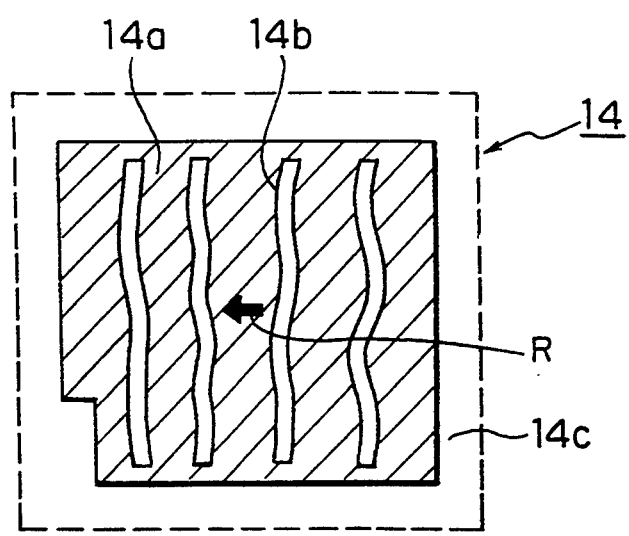
FIG. 25B is a plan view showing a lower electrode.

FIG. 25A illustrates a pattern of the upper electrode. FIG. 25B illustrates a pattern of the lower electrode.

As the upper substrate, a chrome black matrix is formed over the entire area of the non-pixel sections. There is used a glass substrate on which to pattern by ITO a common electrode 13 forming on it the waved stripes of conductive sections 13a and the non-conductive sections 13b having the width narrower than the conductive sections per pixel. As the lower substrate, there is used a glass substrate with a switching device comprising the lower electrode 14 having the conductive sections 14a the width of which is narrower than that of the non-conductive sections 13b on the upper substrate, and TFT (not shown). Here, the region 14c surrounding the lower substrate is the one where the wiring and TFT are formed.

Using these substrates, the LCD of the present invention is produced with the "superposed nest" structure under the same conditions and by use of the same materials as in the embodiment 3. With the same method and under the same conditions as the embodiment 3, the electro-optical characteristics (transmittance-applied voltage curve) of the LCD of the present embodiment are measured. The result of measurement is shown in FIG. 27. In a state where no voltage is applied (0V applied), the transmittance is approximately 80% and indicates a bright transmittance characteristic. Also, at an applied voltage of 2.5 V to 3.3 V, which is lower than the voltage applied to the embodiment 3, the minimum transmittance is 0.5%, and a good light scattering condition is obtainable. Also, as clear from FIG. 27, there is no hysteresis at all in the electro-optical characteristics. Also, at an applied voltage of 2.5 V and 0 V, the response speeds are measured. The result is that an extremely quick speed of response is obtainable, that is, 5 msec at rising, and 12 msec at decaying.

Then, a voltage is applied through the TFT on the lower substrate to examine the maintaining condition of the aforesaid walls by observing the molecular arrangement by use of a polarizing microscope and by measuring the state of light scattering by the transmittance measurement. For the present embodiment, it is confirmed that the initial arrangement of walls is maintained even after one hour when an applied voltage of 2.5 V is continuously supplied.

EMBODIMENT 6

Figure 26A:
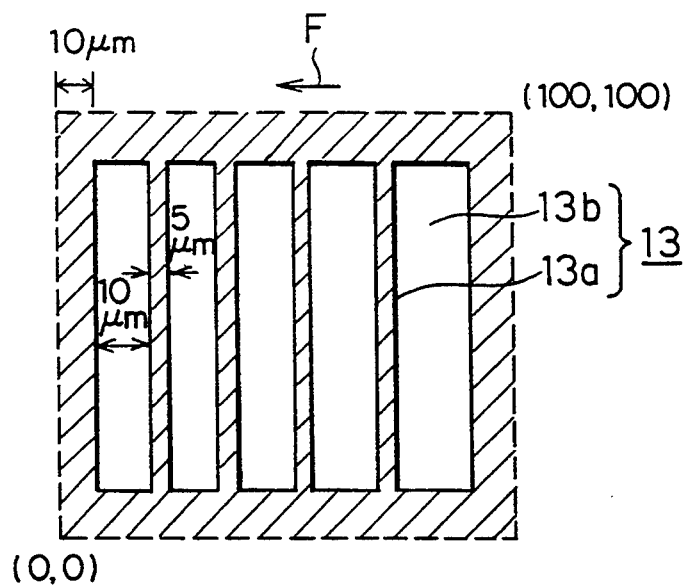
FIG. 26A is a view illustrating still another embodiment, and a front view showing an upper electrode (common electrode).
Figure 26B:
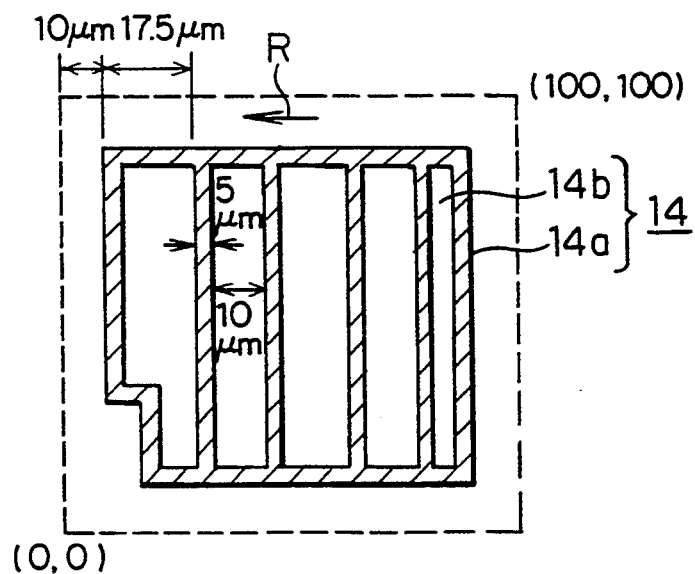
FIG. 26B is a plan view showing a lower electrode.

FIG. 26A illustrates a pattern of the upper electrode. FIG. 26B illustrates a pattern of the lower electrode.

As the upper substrate, a chrome black matrix is formed over the entire area of the non-pixel sections. There is used a glass substrate on which to pattern by ITO a common electrode 13 forming on it the straight line stripes of conductive sections 13a and the non-conductive sections 13b having the width narrower than the conductive sections per pixel. As the lower substrate, there is used a glass substrate with a switching device comprising the lower electrode 14 having the straight line stripes of conductive sections 14a, and TFT. The width of conductive sections of the upper and lower electrodes is 5 µm, and the width of non-conductive sections thereof, 10 µm.

Using these substrates, the LCD of the present invention is produced with the "spaced stripe nest" structure under the same conditions and by use of the same materials as in the embodiment 3. With the same method and under the same conditions as the embodiment 3, the electro-optical characteristics (transmittance-applied voltage curve) of the LCD of the present embodiment are measured. The result of measurement is shown in FIG. 27. In a state where no voltage is applied (0 V applied), the transmittance is approximately 80% and indicates a bright transmittance characteristic. Also, at an applied voltage of 3.2 V to 3.9 V, the minimum transmittance is 0.2%, and a, better light scattering condition than that of the embodiment 3 is obtained. Also, as clear from FIG. 27, there is no hysteresis at all in the electro-optical characteristics. Also, at an applied voltage of 3.2 V and 0 V, the response speeds are measured. The result is that an extremely quick speed of response is obtainable, that is, 6 msec at rising, and 18 msec at decaying.

Then, a voltage is applied through the TFT on the lower substrate to examine the maintaining condition of the aforesaid walls by observing the molecular arrangement by use of a polarizing microscope and by measuring the state of light scattering by the transmittance measurement. For the present embodiment, it is confirmed that the initial arrangement of walls is maintained even after one hour when an applied voltage of 3.2 V is continuously supplied.

EMBODIMENT 7

Using the same upper and lower substrates as the embodiment 3, an alignment treatment is given to the materials with the same method, and then, as the wall supporting device as described earlier, fine grains (Product Name: micropearl manufactured by Sekisui Fine Chemical Co.) (the granular diameter: 5.0 µm) is coated on the upper substrate side by a dry spraying method so that the dispersion density can be 1,000 pieces/mm$^2$ Thereafter, in the same steps and by use of the same materials as in the embodiment 1, the liquid crystal display device of the present invention is produced. When each of the characteristics are measured with the same method and under the same conditions as in the embodiment 3, an excellent result which is substantially the same as that of the embodiment 3 is obtained. Also, in the same manner as in the embodiment 3, a voltage is applied through the TFT on the lower substrate to examine the maintaining condition of the aforesaid walls by observing the molecular arrangement by use of a polarizing microscope and by measuring the state of light scattering by the transmittance measurement. For the present embodiment, it is confirmed that the initial arrangement of walls is maintained even after ten hours when an applied voltage of 3.1 V is continuously supplied.

EMBODIMENT 8

Figure 28A:
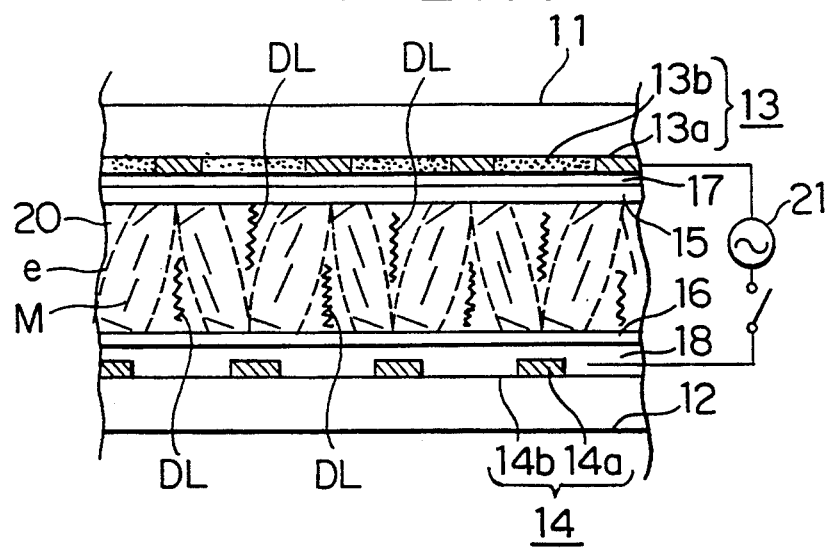
FIG. 28A is a view showing a state of the structural arrangement of electrodes and liquid crystal molecules of LCD using a transparent insulating film.
Figure 28B:
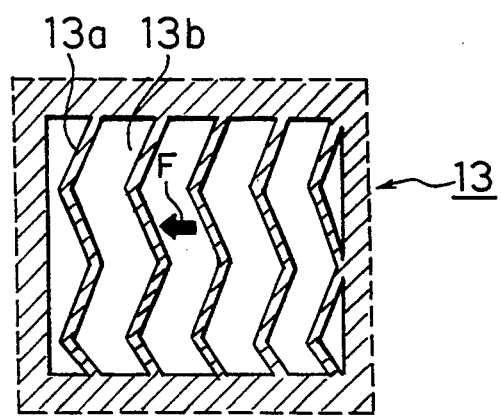
FIG. 28B is a plan view showing an upper electrode (common electrode).
Figure 28C:
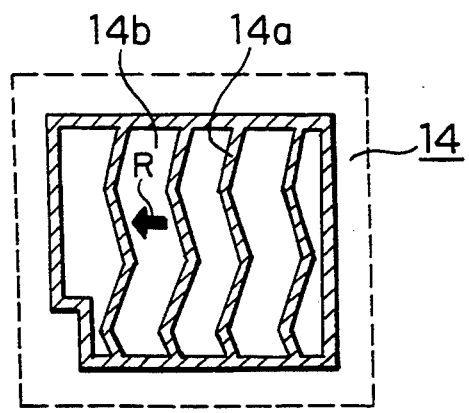
FIG. 28C is a plan view showing a lower electrode.

FIG. 28A is a view showing the cross-section of the liquid crystal cell in which the electrodes are opposed to each other. FIG. 28B illustrates a pattern of the upper electrode in one pixel region. FIG. 28C illustrates a pattern of the lower electrode in one pixel region. The electrode patterns on the upper and lower substrates are the same as those of the embodiment 3.

On the pixel electrodes 13 and 14 on the upper and lower substrates, a transparent insulating material (Product Name: RTZ-206 manufactured by Catalytic Chemical Industrial Co.) having refractive index of 1.9 is overcoated as transparent insulating layers 17 and 18 to form a transparent layer of 1.0 μm thick. In this way, the substrates of the structure shown in FIG. 28A is obtained.

Using these substrates, the LCD is obtained with the same method and under the same conditions as in the embodiment 3. The electro-optical characteristics (transmittance-applied voltage curve) of the LCD thus obtained are measured by the method shown in the embodiment 1. The result of measurement is shown in FIG. 29. In a state where no voltage is applied (0 V applied), the transmittance is approximately 85% and indicates a bright transmittance characteristic. Also, at an applied voltage of 3.3V, the minimum transmittance is 0.4%, and a good light scattering condition is obtained. Also, as clear from FIG. 29, there is no hysteresis at all in the electro-optical characteristics. Also, at an applied voltage of 3.1 V and 0 V, the response speeds are measured. The result is that an extremely quick speed of response is obtainable, that is, 6 msec at rising, and 18 msec at decaying.

Then, a voltage is applied through the TFT on the lower substrate to examine the maintaining condition of the aforesaid walls by observing the molecular arrangement by use of a polarizing microscope and by measuring the state of light scattering by the transmittance measurement. For the present embodiment, it is confirmed that the initial arrangement of walls is maintained even after one hour when an applied voltage of 3.1 V is continuously supplied.

EMBODIMENT 9

Using the upper and lower substrates having the electrode patterns represented in the embodiment 4, a transparent insulating material (Product Name: RTZ-606 manufactured by Catalytic Chemical Industrial Co.) having refractive index of 1.90 is overcoated to form a transparent layer of 1.0 μm thick.

Using these substrates, the LCD is obtained by the same method and under the same conditions as in the embodiment 4. The electro-optical characteristics (transmittance-applied voltage curve) of the LCD thus obtained are measured by the method represented in the embodiment 1. The result of measurement is shown in FIG. 29. As shown in FIG. 29, the obtained result is excellent substantially equal to that of the embodiment 8. Also, the response speed and the condition of wall maintenance are substantially as good as the embodiment 8. Further, against the incident light, no light interference occurs due to the electrodes when no voltage is applied. Therefore, the transmittance is enhanced at the time of no voltage being applied voltage. Improved effect is also obtained for the contrast.

EMBODIMENT 10

Using the upper and lower substrates having the electrode patterns represented in the embodiment 5, a transparent insulating material (Product Name: RTZ-606 manufactured by Catalytic Chemical Industrial Co.) having refractive index of 1.90 is overcoated to form a transparent layer of 1.0 μm thick.

Using these substrates, the LCD is obtained by the same method and under the same conditions as in the embodiment 5. The electro-optical characteristics (transmittance-applied voltage curve) of the LCD thus obtained are measured by the method represented in the embodiment 1. The result of measurement is shown in FIG. 29. As shown in FIG. 29, the obtained result is excellent substantially equal to that of the embodiment 8. Also, the response speed and the condition of wall maintenance are substantially as good as the embodiment 8. Further, against the incident light, no light interference occurs due to the electrodes when no voltage is applied. Therefore, the transmittance is enhanced at the time of no voltage being plied. Improved effect is also obtained for the contrast.

EMBODIMENT 11

With the exception of the use of the upper and lower substrates having the electrode patterns represented in the embodiment 6, the LCD is obtained by the same method and under the same conditions as in the embodiment 8. The electrooptical characteristics (transmittance-applied voltage curve) of the LCD thus obtained are measured by the method represented in the embodiment 1. The result of measurement is shown in FIG. 29. As shown in FIG. 29, the obtained result is excellent substantially equal to that of the embodiment 8. Also, the response speed and the condition of wall maintenance are substantially as good as the embodiment 8. Further, against the incident light, no light interference occurs due to the electrodes when no voltage is applied. Therefore, the transmittance is enhanced at the time of no voltage being applied. Improved effect is also obtained for the contrast.

EMBODIMENT 12

With the exception of the use of the upper and lower substrates having the electrode patterns represented in the embodiment 7, the LCD is obtained by the same method and under the same conditions as in the embodiment 8. The electrooptical characteristics (transmittance-applied voltage curve) of the LCD thus obtained are measured by the method represented in the embodiment 1. The result of measurement is shown in FIG. 29. As shown in FIG. 29, the obtained result is excellent substantially equal to that of the embodiment 8. Also, the response speed and the condition of wall maintenance are substantially as good as the embodiment 8. Further, against the incident light, no light interference occurs due to the electrodes when no voltage is applied. Therefore, the transmittance is enhance at the time of no voltage being applied. Improved effect is also obtained for the contrast.

EMBODIMENT 13

Figure 30:
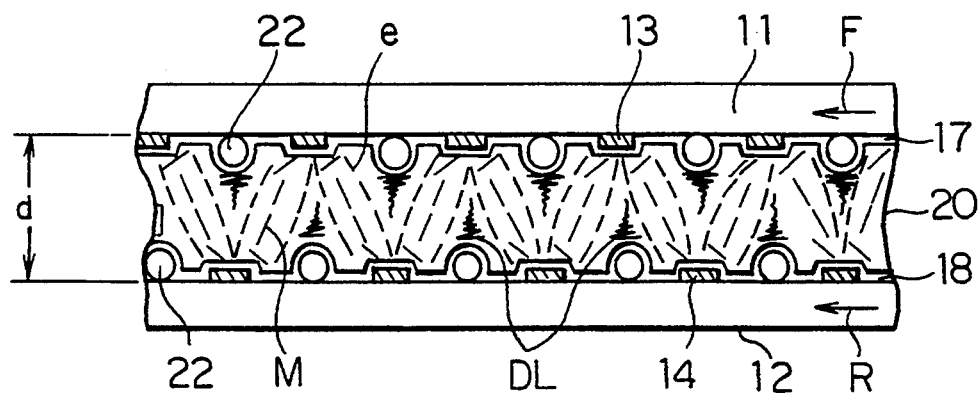
FIG. 30 is a view showing a state of the structural arrange of electrode and liquid crystal molecules according to an embodiment in which fine grains are formed on the surfaces of substrates.

As shown in FIG. 30, there are used the substrates forming on them the upper electrode 13 on the upper substrate 11, and the lower electrode 14 on the lower substrate 12 by use of the electrode patterns represented in the embodiment 4, fine grains 22 (Product Name: micropearl SP manufactured by Sekisui Fine Chemical Co.) having the granular diameter of 1.5 μm are diffused on the surfaces of the electrode sides of both substrates so that the diffusion density becomes 1,000 pieces/mm$^2$. On theses electrodes and fine grains, a transparent insulating material (Product Name: RTZ-206 manufactured by Catalytic Chemical Industrial Co.) is overcoated to finish the surfaces of the substrates irregularly. With the exception of the use of the upper and lower substrates thus prepared, the LCD is obtained by the same method and under the same conditions as in the embodiment 8. The LCD thus obtained presents the electro-optical characteristics, the response speed and the condition of wall maintenance substantially as good as the embodiment 8. Also, by the provision of the transparent insulating layers, the discontinuation of the conductive sections of the electrodes is eliminated, thus making it possible to prevent the light interference from being generated.

EMBODIMENT 14

Figure 31A:
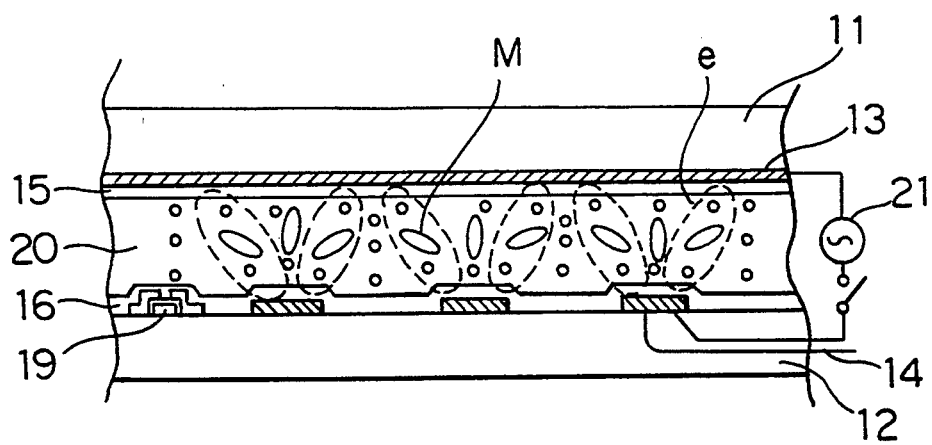
FIG. 31A is a view illustrating an embodiment, and showing a state of the structural arrangement of electrodes and liquid crystal molecules.
Figure 31B:
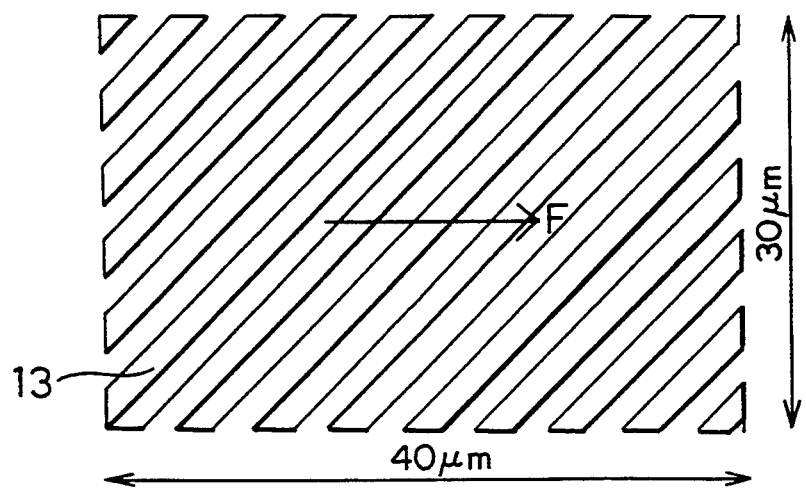
FIG. 31B is a plan view showing an upper electrode (common electrode).
Figure 31C:
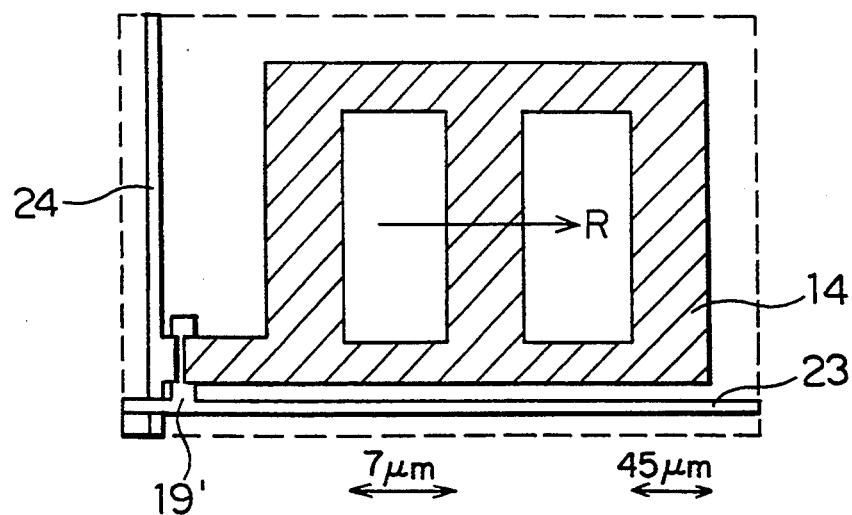
FIG. 31C is a plan view showing a lower electrode.
Figure 31D:
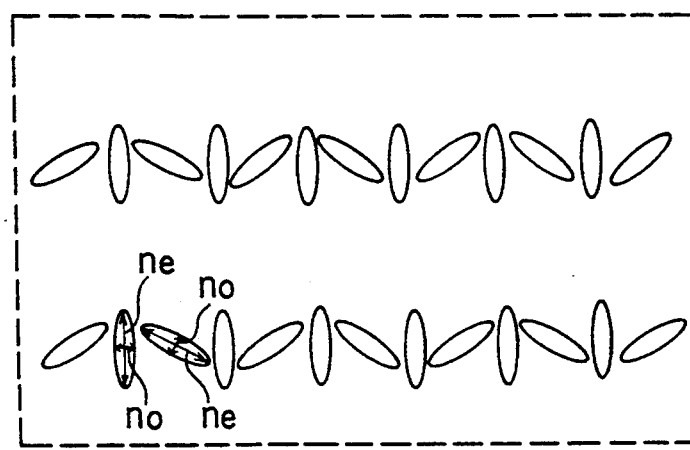
FIG. 31D is a plan view showing a state of liquid crystal molecules.

FIG. 31A is a view showing the cross-section of the liquid crystal cell in which the electrodes of the present embodiment are opposed to each other. FIG. 31B illustrates the upper electrode pattern in one pixel region. FIG. 31C illustrates the lower electrode pattern in one pixel region. FIG. 31D illustrates the liquid crystal molecular arrangement when a voltage is applied.

As shown in FIG. 31B, an ITO non-segmented electrode is used for the upper electrode 13. No black matrix is provided for the light shielding of the non-pixel sections. The size of one pixel for the lower electrode 14 is 30 μm×40 μm, and the spray patterns, in which the ITO in the conductive sections is 4.5 μm in width, and the non-conductive sections is 7 μm, are formed per pixel as shown in FIG. 31C. The TFT switching devices 19 are formed for each of the pixels to obtain the lower substrate having a pixel number of 1,280×1,024.

On the electrode patterns of the substrates, alignment films 15 and 16 (Product Name: SE-7120 manufactured by Nissan Chemical Industrial Co.) (the measured value of pretilt angles: 6°) are formed. A rubbing treatment is given to the surface thereof in the directions F and R as shown in FIG. 30. Then, after spraying fine grains (Product Name: micropearl SP manufactured by Sekisui Fine Chemical Co.) (the granular diameter: 6.0 μm) by a dry spray method to make its diffusion density 100 pieces/mm$^2$ on the lower substrate side as a spacing agent for the substrates so that the thickness of the liquid crystal layer becomes 6 μm, a liquid crystal component 20 (Product Name: ZLI-4792 manufactured by MERCK Japan, Inc.) (Δn=0.094) of positive dielectric anisotropy is held between the substrates to obtain the LCD of the present embodiment.

The features of the cell structure of the present embodiment are represented by the three characteristics given below.

Firstly, the liquid crystal molecular arrangement is made in parallel to the stripe direction of the electrodes when no voltage is applied. That is, the direction of the tilted electric field and the liquid crystal arrangement are rectangular to each other when a voltage is applied. Therefore, the tilted electric field is formed in the direction rectangular to the liquid crystal molecular arrangement when a voltage is applied. The liquid crystal is tilted while being twisted in this direction. As a result, when the voltage is applied, the liquid crystal arrangement presents the states as shown in FIG. 31A at its cross-section, and in FIG. 31D when observed toward its plane. With such arrangement of liquid crystal, the refractive index with respect to the stripe direction of the electrodes and the polarized component in the direction rectangular to it is to represent such an arrangement that the refractive index of extraordinary rays ne and the refractive index of ordinary rays $n_0$ are regularly alternative in the direction rectangular to the stripe direction of the electrodes. Therefore, it is possible to scatter the parallel light because the diffraction grating is formed on the liquid crystal layer.

Secondarily, in order to obtain the tilted electric field effectively, the space D between the opposing electrodes arranged on both substrates is set to satisfy D≧S/2. Here, the S is the width of the narrowest part of the non-conductive sections.

In the present embodiment, the width S between the patterns of the stripe electrode pattern (FIG. 31C) is 7 μm, and the space D between the electrodes on both substrates is 6 μm. Therefore, the above-mentioned relational express can be satisfied.

Thirdly, the Δnd of the liquid crystal layer is set at 564 nm. This value is smaller than that of the above-mentioned embodiment because the light scattering effect of the diffraction grating depends on the Δnd. The light scattering effect of the diffraction grating is expressed by the following equation according to GALE, Met al: 1979 J.appl.Photogr. Engng, 4, 41:

$$T=\cos^2(\pi\Delta nd/\lambda)$$

Here, the T is the intensity of light to be scattered (intensity against the incident light), λ is the wavelength of the incident light. By this equation, the light scattering effect of the diffraction grating depends on the Δnd. According to the liquid crystal cell structure of the present embodiment, this Δnd changes by the applied voltages. The latitude of such changes from 0 to a value (564 nm) after the Δnd set for the liquid crystal layer. Also, by the above-mentioned equation, the light scattering effect of the diffraction grating has a pole value with respect to the Δnd. Therefore, if the set value of Δnd is extremely larger than the pole value of the above-mentioned equation, a pole value is generated in the electro-optical characteristics of the liquid crystal cell. This makes it difficult to execute a gradational expression using analog signals. Consequently, therefore, in consideration of this condition, the Δnd of the liquid crystal layer is set at 564 nm in the present embodiment. As above-mentioned, the present embodiment is structured to make it possible to obtain the effect of the diffraction grating definitely in addition to the refraction lens effect to be formed by the liquid crystal arrangement as in the other embodiments (the aforesaid wall arrangement: the effect to refract the incident light being produced with the continuous changes of the refractive index by changing the tilting of the liquid crystal molecules continuously in the thickness direction of the liquid crystal layer).

Figure 32:
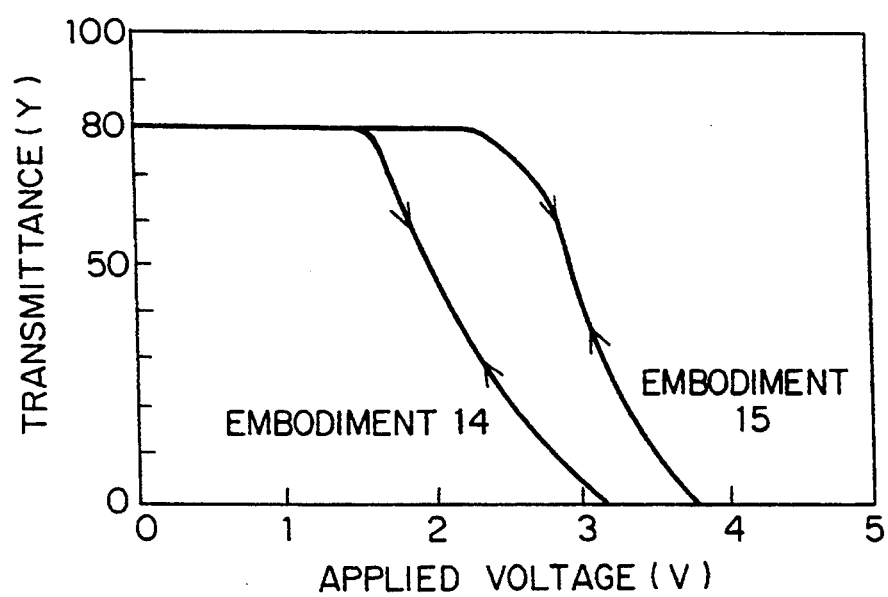
FIG. 32 is a view showing the relationship represented by the transmittance and applied voltage curb for an device according to the embodiment 14.

A voltage is applied to the LCD thus obtained through TFT, and the electro-optical characteristics (transmittance-applied voltage curve) are measured by the method shown in the embodiment 1. The result of measurement is shown in FIG. 32. In a state where no voltage is applied (0 V applied), the transmittance is approximately 80% and indicates a bright transmittance characteristic. Also, at an applied voltage of more than 3.2 V, the minimum transmittance is 0.2%, and a good light scattering condition is obtained. Also, as clear from FIG. 32, there is no hysteresis at all in the electro-optical characteristics. Also, at an applied voltage of 3.2 V and 0 V, the response speeds are measured. The result is that an extremely quick speed of response is obtainable, that is, 7 msec at rising, and 23 msec at decaying.

EMBODIMENT 15

With the exception of alignment films 15 and 16 (Product Name: JALS-204-R14 manufactured by Nippon Synthetic Rubber Co.) providing the vertical alignment, and liquid crystal component 20 (Product Name: ZLI-4818 manufactured by MERCK Japan, Inc.)

($\Delta n=0.1243$) of negative dielectric anisotropy being used for the alignment films and component, respectively, the LCD of the present embodiment is obtained by the same method used for the embodiment 14.

Figure 33A:
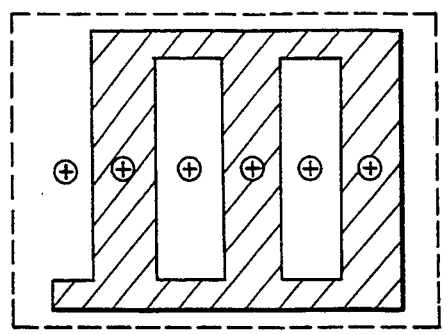
FIG. 33A is a plan view showing the liquid crystal molecular arrangement at the time of no voltage being applied according to the embodiment 15.
Figure 33B:
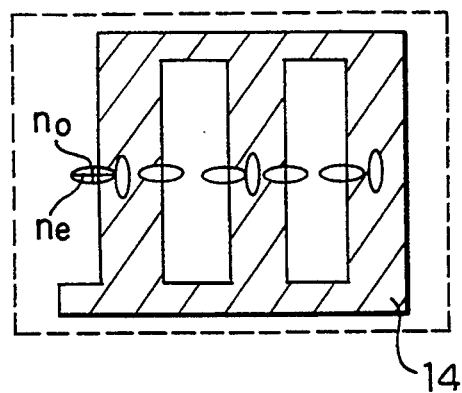
FIG. 33B is a plan view showing the liquid crystal molecular arrangement at the time of a voltage being applied according to the embodiment 15.

The liquid crystal molecular arrangements of the LCD of the present embodiment at the time of no voltage and a voltage being applied, observed respectively in plan, are represented in FIG. 33A and FIG. 33B.

In a state where no voltage is applied (FIG. 33A), the liquid crystal molecules are uniformly aligned (vertical alignment). In contrast, when a voltage is applied (FIG. 33B), the liquid crystal molecules are tilted down in the rubbing orientation where the ITOs are opposed to each other on the upper and lower substrates, and on the contrary, the molecules are tilted down in the direction rectangular to the direction of electrode stripes because the tilted electric field is generated in that direction in a region where the ITOs are not present on the substrates. Therefore, in the LCD of the present embodiment, the refractive index with respect to the direction of electrode stripes and the component of the polarized light in the direction rectangular to it is such that the refractive index $n_e$ of the extraordinary rays of the liquid crystal molecules and the refractive index $n_0$ of the ordinary rays thereof are alternately arranged regularly in the direction rectangular to the direction of the electrode stripes as shown in FIGS. 33A and 33B in the same manner as in the embodiment 14. As a result, the diffraction grating is generated on the liquid crystal layer, thus making it possible to disturb the parallel light. The present embodiment is structured in the same way as the embodiment 14A so that the effects of the diffraction grating and refraction lens can be obtained. Compared to the embodiment 14, the molecular arrangement of the present embodiment is contrary (against the horizontal alignment, this is aligned vertically) when no voltage is applied, and the induced anisotropy of the liquid crystal component is also contrary (against positive, this is negative). Therefore, if only the refractive index of the LCD of the present embodiment is arranged with respect to the direction of the electrode stripes and the component of the polarized light in the direction rectangular to it so that the refractive index $n_e$ of the extraordinary rays of the liquid crystal molecules and the refractive index $n_0$ of the ordinary rays thereof are alternately arranged regularly in a specific direction (one direction or more) in a state where a voltage is applied, the diffraction grating is generated on the liquid crystal layer, making it possible to obtain the effect to disturb the parallel light. If only an arrangement should be made to obtain this effect for the bidirectional component of the polarized light, it is possible to disturb any non-polarized light, hence obtaining a high contrast characteristic. A structure of the kind can be implemented easily by use of a liquid crystal component of negative dielectric anisotropy with the vertical alignment the degree of freedom of which is infinite in initiation in the tilt direction of the liquid crystal molecules (tilt direction and tilt down direction).

A voltage is applied to the LCD thus obtained through TFT, and the electro-optical characteristics (transmittance-applied voltage curve) are measured by the method shown in the embodiment 1. The result of measurement is shown in FIG. 32. In a state where no voltage is applied (0 V applied), the transmittance is approximately 80% and indicates a bright transmittance characteristic. Also, at an applied voltage of more than 3.8 V or more, the minimum transmittance is 0.2%, and a good light scattering condition is obtained. Also, as clear from FIG. 32, there is no hysteresis at all in the electro-optical characteristics. Also, at an applied voltage of 3.8 V and 0 V, the response speeds are measured. The result is that an extremely quick speed of response is obtainable, that is, 10 msec at rising, and 20 msec at decaying.

EMBODIMENT 16

Figure 34:
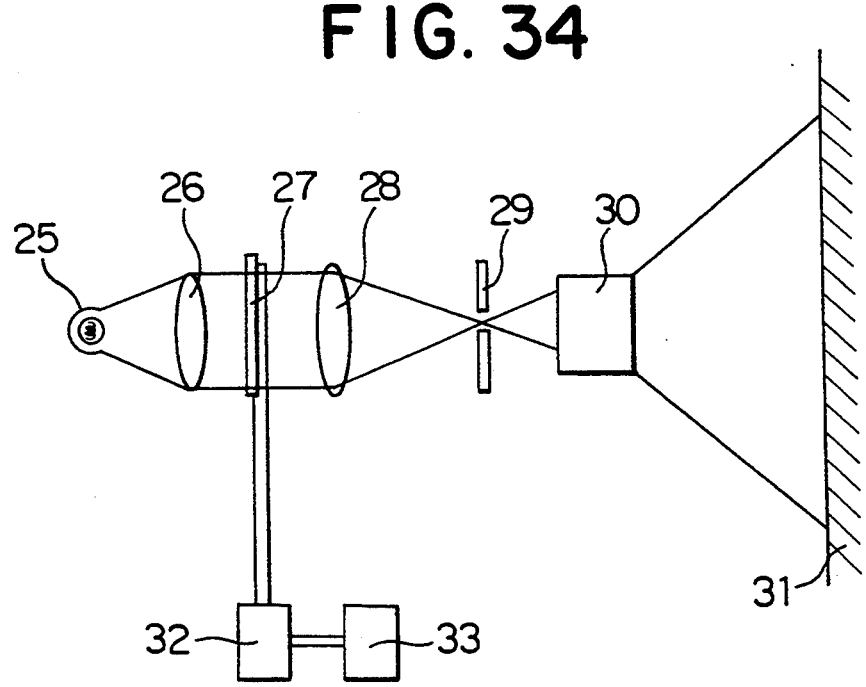
FIG. 34 is a view showing a projection liquid crystal display apparatus according to the embodiment 16.

Using the LCD obtained in the embodiment 15, a projection type liquid crystal display apparatus is produced. The structure thereof is shown in FIG. 34. The light from its source supplied by a metal halide lamp 25 is made a parallel light by use of Schlieren lens 26, and projected onto a screen 31 by a photographing lens unit 30 through the liquid crystal cell 27 and a condenser lens. An image inputted into the liquid crystal cell 27 by a driver 32 and a video signal generator 33 is displayed on the screen 31 in an enlarged form. The LCD of the present invention is capable of controlling the optical path of the parallel light by the application of an electric filed so that the light can advance straightly or scattered. Therefore, as shown in FIG. 34, if only the Schlieren optical system is used, it is possible to display an image on the screen 31 arbitrarily. The structure of the present embodiment is arranged so that a diaphragm (5 mm $\psi$) 29 is provided at the position of the focal point of the condenser lens 28 for shielding the disturbed light in the liquid crystal cell 31, thus making it possible to project only the sprightly advancing rays of the parallel light incident upon the liquid crystal cell 31.

Using a projection type liquid crystal display apparatus thus obtained, an image of monochrome video signals is projected in magnification of approximately 30. Then it is found that the contrast ratio indicates an extremely high value of approximately 200:1. Also, an extremely bright display is obtained.

EMBODIMENT 17

Figure 35:
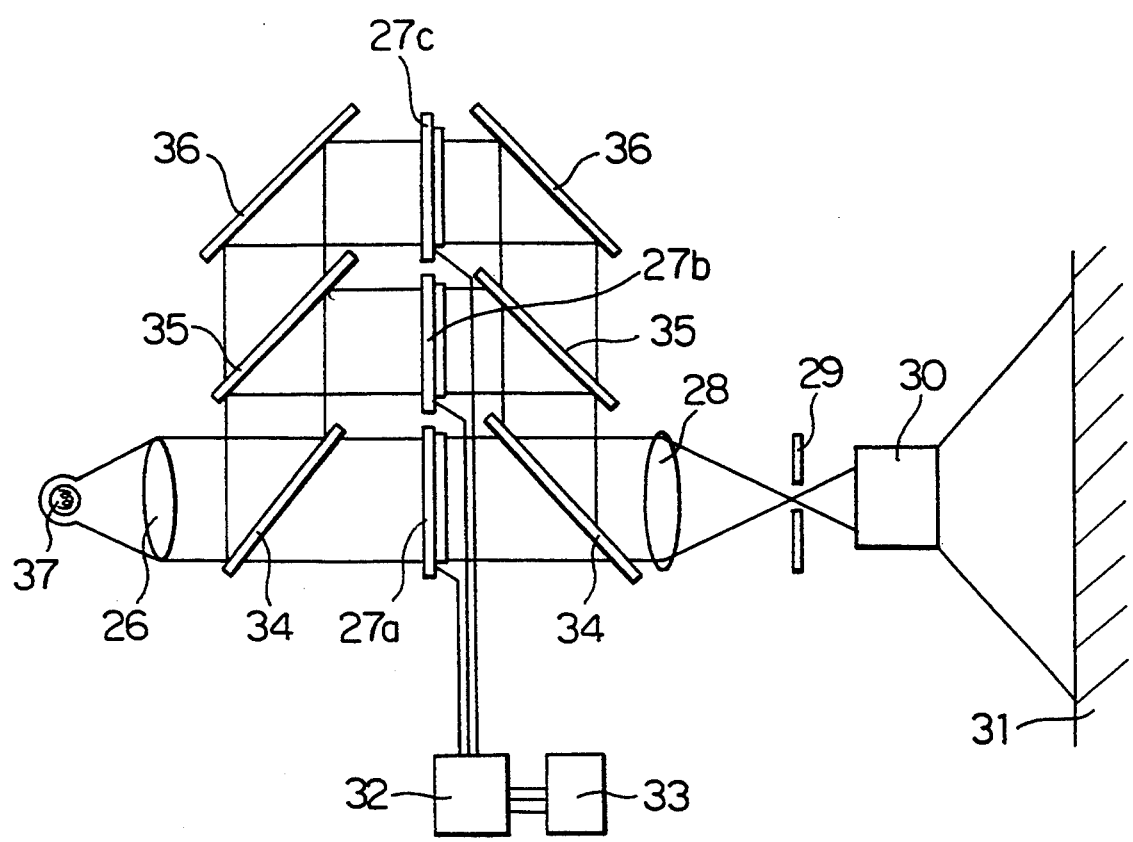
FIG. 35 is a view showing a projection liquid crystal display apparatus according to the embodiment 17.
Figure 36A:
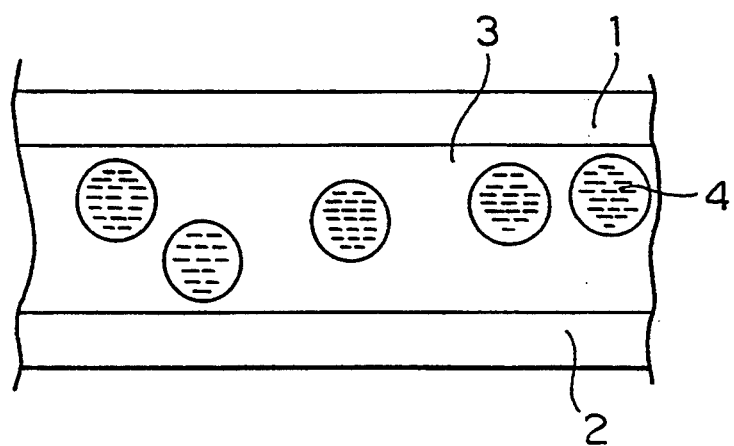
FIG. 36A is a view showing the conventional LCD, and showing the cross-section of a capsule structure.
Figure 36B:
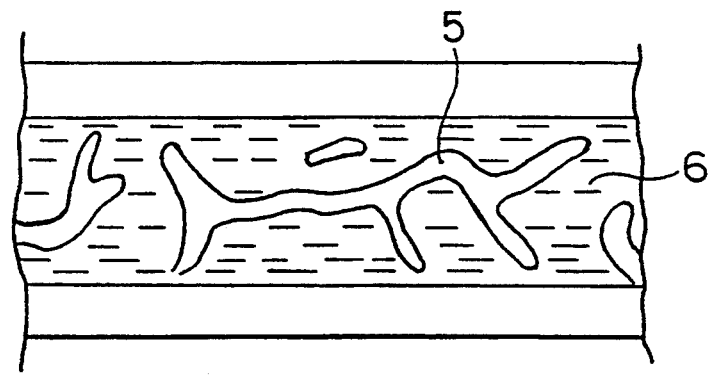
FIG. 36B is a view showing the cross-section of a fabric polymer structure.

A projection type liquid crystal display apparatus is produced by use of three LCDs obtained in the embodiment 15. The structure thereof is shown in FIG. 35. In the present embodiment, a white light source 37 containing three wavelength of RGB is used its light source. This source light is divided into the respective wavelength of RGB by use of diochroic mirrors 34 and 35, and a total reflection mirror 36 so that each of them is incident upon the three liquid crystal cells 27a, 27b, and 27c. In this way, it is possible to control the optical path for each of the wavelengths. As a result, a color display can be performed. In this respect, the diochroic mirror 34 allows the red wavelength to transmit through it while totally reflection green and blue wavelengths. The diochroic mirror 35 allows the blue wavelength to transmit through it while totally reflecting red and green wavelengths.

Using a projection liquid crystal display apparatus thus obtained, an image of full-color video signals is projected in magnification of approximately 30. Then it is found that the contrast ratio indicates an extremely high value of approximately 180:1. Also, an extremely bright display is obtained.

EMBODIMENT 18

As an upper electrode, a non-segmented electrode formed by ITO is produced on color filters. With the exception of the substrates with color filters of RGB to be used, the LCD is obtained in the same way as the embodiment 15. Using this LCD, a projection liquid crystal display apparatus is produced as in the embodiment 16. With the provision of color filters, a color display can be implemented.

Using a projection liquid crystal display apparatus thus obtained, an image of full-color video signals is projected in magnification of approximately 30. Then it is found that the contrast ratio indicates an extremely high value of approximately 160:1. Also, an extremely bright display is obtained.

What is claimed is:

1. A liquid crystal display device comprising:
   a pair of substrates with electrodes arranged to face each other;
   a liquid crystal layer with a nematic liquid crystal component held between said substrates;
   at least one of said substrates with the electrodes facing each other has a region where the electrode structure is formed by conductive sections the width of which is 50 μm or less for the widest part per pixel, and non-conductive sections the width of which is 50 μm or less for the widest part per pixel;
   at least a part of the region in a pixel, said conductive sections and said non-conductive sections are opposed to each other per pixel between the substrates arranged to face each other; and
   being given the width of the narrowest part of said non-conductive sections as S, and the distance between the electrodes of said substrates arranged to face each other as D, the relationship of
   $D \geq S/2$
   is satisfied.

2. A liquid crystal display device according to claim 1, wherein said liquid crystal layer is formed by the nematic liquid crystal component having the molecular arrangement capable of providing the tilt direction in two or more directions when an electric field is applied.

3. A liquid crystal display device according to claim 1, wherein between the substrates arranged to face each other, an electric field tilted to the direction of the normal vertical line between said substrates are formed in two or more directions per pixel, and
   the liquid crystal molecules forming said liquid crystal layer present a spray arrangement in a state where no electric field is applied, and the molecular arrangement can provide the degree of freedom of tilt up or tilt down in two or more directions.

4. A liquid crystal display device according to claim 1, wherein the width of the widest part of at least one of said substrates with electrodes arranged to face each other is 30 μm or less,
   said nematic liquid crystal component has means for inducing the tilt alignment capable of arranging the longer axes of the liquid crystal molecules in one direction on the surfaces of said substrates, and given the intersecting angle of the directions of liquid crystal molecular arrangement on the two substrates as $\theta$ ($0° \leq \theta \leq 90°$), and the cell twist angle determining the uniformed twist arrangement of liquid crystal by the pretilt angles on the surfaces of two substrates as $\psi$, and then, said $\psi$ is $\pm \theta$ (where the counterclockwise twist defined as +, and the clockwise twist, as −), in a state that no electric field is applied to said liquid crystal layer, the twisted angle $\omega$ is $\pm \theta + 180°$ or $\pm \theta - 180°$, and when said $\psi$ is $\pm(\theta - 180°)$, the twisted angle $\omega$ is $\pm \theta$, with the proviso that $\theta$, $\omega$ and $\psi$ have the same mark.

5. A liquid crystal display device according to claim 1, wherein
   when both of the substrates arranged to face each other are observed at the cross-section in the direction of the normal line of the electrodes on said substrates, the width RE having the conductive sections only on the lower substrate, the width FE having the conductive sections only on the upper substrate, and the width SS having the non-conductive sections on said substrates are arranged in the order of:
   RE·SS·FE·SS·RE·SS·FE·SS·...
   in the sectional shape, the RE and FE are arranged alternately with the SS between them, and also, at least per pixel, the RE are electrically connected to each other in a location in the pixel to form the electrode structure, and the FE are electrically connected to each other in a location in the pixel to form the electrode structure,
   said nematic liquid crystal component has means for inducing the tilt alignment capable of arranging the longer axes of the liquid crystal molecules in one direction on the surfaces of said substrates, and given the intersecting angle of the directions of liquid crystal molecular arrangement on the two substrates as $\theta$ ($0° \leq \theta \leq 90°$), and the cell twist angle determining the uniformed twist arrangement of liquid crystal by the pretilt angles on the surfaces of two substrates as $\psi$, and then, said $\psi$ is $\pm \theta$ (where the counterclockwise twist defined as +, and the clockwise twist, as −), in a state that no electric field is applied to said liquid crystal layer, the twisted angle $\omega$ is $\pm \theta + 180°$ or $\pm \theta - 180°$, and when said $\psi$ is $\pm(\theta - 180°)$, the twisted angle $\omega$ is $\pm \theta$, with the proviso that $\theta$, $\omega$ and $\psi$ have the same mark.

6. A liquid crystal display device according to claim 1, wherein
   when both of the substrates arranged to face each other are observed at the cross-section in the direction of the normal line of the electrodes on said substrates, the width RE having the conductive sections only on the lower substrate, the width FE having the conductive sections only on the upper substrate, and the width EE having the conductive sections on said substrates are arranged in the order of:
   RE·EE·FE·EE·RE·EE·FE·EE·... or
   RE·FE·RE·FE·RE·FE·...
   in the sectional shape, the RE and FE are arranged alternately with the EE between them or RE and FE are arranged alternately, and also, at least per pixel, the RE are electrically connected to each other in a location in the pixel to form the electrode structure, and the FE are electrically connected to each other in a location in the pixel to form the electrode structure,
   said nematic liquid crystal component has means for inducing the tilt alignment capable of arranging the longer axes of the liquid crystal molecules in one direction on the surfaces of said substrates, and given the intersecting angle of the directions of liquid crystal molecular arrangement on the two substrates as $\theta$ ($0° \leq \theta \leq 90°$), and the cell twist angle determining the uniformed twist arrangement of liquid crystal by the pretilt angles on the surfaces of two substrates as $\psi$, and then, said $\psi$ is $\pm \theta$ (where the counterclockwise twist defined as +, and the clockwise twist, as −), in a state that no electric field is applied to said liquid crystal layer, the twisted angle $\omega$ is $\pm\theta+180°$ or $\pm\theta-180°$ and when said $\psi$ is $\pm(\theta-180°)$, the twisted angle $\omega$ is $\pm\theta$, with the proviso that $\theta$, $\omega$ and $\psi$ have the same mark.

7. A liquid crystal display device according to claim 1, wherein said liquid crystal component comprises the liquid crystal of positive or negative dielectric anisotropy, and the tilt directions in two or more directions obtainable when an electric field is applied are the tilt up direction if the liquid crystal has said positive dielectric anisotropy, and the tilt down direction if the liquid crystal has said negative dielectric anisotropy.

8. A liquid crystal display device according to claim 7, wherein the liquid crystal molecular arrangement on said substrates is either one of the liquid crystal molecular arrangement having the difference of 0.5° or less in pretilt angles of liquid crystal; the liquid crystal molecular arrangement formed by the vertical alignment the pretilt angles of which are both 45° or more and 90° or less; and the liquid crystal molecular arrangement having the difference of 0.5° or less in the pretilt angles of the upper and lower substrates, and also, a bending alignment having the directions in which said pretilt angle is equally obtainable on the upper and lower substrates.

9. A liquid crystal display device according to claim 1, wherein the electrode structure per pixel is in the striped shape formed by the conductive sections and non-conductive sections together with said substrates at least on a part of each pixel.

10. A liquid crystal display device according to claim 1, wherein at least a switching device is provided per pixel for at least one of said substrates with electrodes.

11. A liquid crystal display device according to claim 1, wherein fine grains having diameter smaller than the distance S between the electrodes is mixed in the space between said substrates or protuberance shorter than the distance D between the electrodes are provided for at least one of said substrates.

12. A liquid crystal display device according to claim 1, wherein transparent protective layers are formed on said electrodes, and the refractive index of said transparent protective layers are 0.9 to 1.1 times the refractive index of said electrode material.

13. A projection type liquid crystal display apparatus comprising:
a liquid crystal display device;
means for allowing parallel light to be incident upon said liquid crystal device;
means for controlling said incident parallel light by use of said liquid crystal display device; and
means for using an optical system to project light in a part of direction of the advancing directions of said controlled light, wherein
said liquid crystal display device is the liquid crystal device according to claim 1.

14. A liquid crystal display apparatus according to claim 12, wherein said liquid crystal display device uses two or more liquid crystal display devices according to claim 1 to allow the spectral parallel light containing at least either one color of red, blue and green to be incident upon them, respectively.

15. A liquid crystal display apparatus according to claim 12, wherein said liquid crystal display device uses the liquid crystal display device according to claim 1, and said liquid crystal display device is provided with two or more colors of color filters.

* * * * *

UNITED STATES PATENT AND TRADEMARK OFFICE
CERTIFICATE OF CORRECTION

PATENT NO. : 5,434,690
DATED : July 18, 1995
INVENTOR(S) : Yuzo HISATAKE et al.

It is certified that error appears in the above-indentified patent and that said Letters Patent is hereby corrected as shown below:

Claim 14, column 36, line 28, change "claim 12" to --claim 13--.

Claim 15, column 36, line 34, change "claim 12" to --claim 13--.

Abstract, line 2, change "neamtic" to --nematic--

Signed and Sealed this

Twenty-eighth Day of May, 1996

Attest:

BRUCE LEHMAN

*Attesting Officer*      *Commissioner of Patents and Trademarks*